United States Patent
Parthasarathy et al.

(10) Patent No.: US 10,721,121 B2
(45) Date of Patent: Jul. 21, 2020

(54) METHODS FOR SYNCHRONIZING CONFIGURATIONS BETWEEN COMPUTING SYSTEMS USING HUMAN COMPUTER INTERFACES

(71) Applicant: Nutanix, Inc., San Jose, CA (US)

(72) Inventors: Ranjan Parthasarathy, Milpitas, CA (US); Constantine Andrew Kousoulis, San Jose, CA (US); John Torres, San Jose, CA (US); Viraj Sapre, Sunnyvale, CA (US)

(73) Assignee: Nutanix, Inc., San Jose, CA (US)

( * ) Notice: Subject to any disclaimer, the term of this patent is extended or adjusted under 35 U.S.C. 154(b) by 22 days.

(21) Appl. No.: 15/836,398

(22) Filed: Dec. 8, 2017

(65) Prior Publication Data

US 2019/0334768 A1 Oct. 31, 2019

Related U.S. Application Data

(60) Provisional application No. 62/432,585, filed on Dec. 11, 2016.

(51) Int. Cl.
*H04L 12/24* (2006.01)
*H04L 29/12* (2006.01)
(Continued)

(52) U.S. Cl.
CPC .......... *H04L 41/0806* (2013.01); *G06F 9/451* (2018.02); *G06F 9/5005* (2013.01);
(Continued)

(58) Field of Classification Search
CPC ............................ H04L 41/08; H04L 41/0866
See application file for complete search history.

(56) References Cited

U.S. PATENT DOCUMENTS

| | | | |
|---|---|---|---|
| 6,182,212 B1 * | 1/2001 | Atkins | G06F 9/4451 713/1 |
| 7,019,558 B1 * | 3/2006 | Jacobson | G06F 30/34 326/38 |

(Continued)

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).

(Continued)

*Primary Examiner* — Lashonda T Jacobs
(74) *Attorney, Agent, or Firm* — Vista IP Law Group, LLP

(57) ABSTRACT

Computer-aided computer system configuration techniques for adding new computing resources to an existing set of computing resources. A method embodiment commences upon identifying an existing computing system having a first set of configuration parameters. A second computing system having a second set of configuration parameters is deployed. A user interface is provided to accept user input comprising a location and protocol to access the existing computing system. Syntactical and semantic differences between the configuration parameters of the existing computing system and those of the newly added set are identified. The identified differences are analyzed to generate a parameter map that relates the existing set of configuration parameters to the second set of configuration parameters and vice-versa. Relationships that are codified in the parameter map are validated through user interactions. The second set of configuration parameters are modified or augmented such that parameters can be synchronized between the two computing systems.

24 Claims, 18 Drawing Sheets

(51) Int. Cl.
G06F 9/50 (2006.01)
H04L 29/08 (2006.01)
G06F 9/451 (2018.01)

(52) U.S. Cl.
CPC ............ *H04L 41/08* (2013.01); *H04L 41/082* (2013.01); *H04L 41/0866* (2013.01); *H04L 41/0879* (2013.01); *H04L 61/1523* (2013.01); *H04L 67/34* (2013.01)

(56) References Cited

U.S. PATENT DOCUMENTS

| | | | | |
|---|---|---|---|---|
| 7,565,416 | B1* | 7/2009 | Shafer | H04L 41/0813 709/203 |
| 7,865,707 | B2* | 1/2011 | Bittlingmayer | G06F 9/44505 713/1 |
| 8,046,383 | B2* | 10/2011 | Weber | G06F 16/84 707/802 |
| 8,549,518 | B1 | 10/2013 | Aron et al. | |
| 8,601,473 | B1 | 12/2013 | Aron et al. | |
| 8,677,342 | B1* | 3/2014 | Kidder | H04L 41/0806 709/221 |
| 8,850,130 | B1 | 9/2014 | Aron et al. | |
| 9,311,314 | B2* | 4/2016 | Beard | G06F 16/119 |
| 9,772,866 | B1 | 9/2017 | Aron et al. | |
| 10,264,089 | B2* | 4/2019 | Reddy | H04L 67/2819 |
| 10,404,799 | B2* | 9/2019 | Mitkar | H04L 67/1097 |
| 2002/0059404 | A1* | 5/2002 | Schaaf | H04L 41/0233 709/220 |
| 2002/0178233 | A1* | 11/2002 | Mastrianni | G06F 8/60 709/217 |
| 2002/0188701 | A1* | 12/2002 | Brown | G06F 9/44505 709/220 |
| 2003/0145067 | A1* | 7/2003 | Cover | H04L 29/06 709/220 |
| 2003/0159028 | A1* | 8/2003 | Mackin | G06F 8/00 713/100 |
| 2005/0278432 | A1* | 12/2005 | Feinleib | G06F 9/4451 709/213 |
| 2005/0289071 | A1* | 12/2005 | Goin | G06F 11/008 705/56 |
| 2006/0020689 | A1* | 1/2006 | Roman | G06F 8/00 709/220 |
| 2006/0026195 | A1* | 2/2006 | Gu | H04L 41/0846 |
| 2006/0064474 | A1* | 3/2006 | Feinleib | G06F 8/63 709/220 |
| 2006/0104220 | A1* | 5/2006 | Yamazaki | H04L 41/0853 370/254 |
| 2009/0055518 | A1* | 2/2009 | Auvenshine | G06F 16/27 709/223 |
| 2009/0119500 | A1* | 5/2009 | Roth | G06Q 10/06 713/100 |
| 2010/0180016 | A1* | 7/2010 | Bugwadia | G06F 9/4411 709/220 |
| 2011/0060719 | A1* | 3/2011 | Kapoor | G06F 16/284 707/602 |
| 2012/0102160 | A1* | 4/2012 | Breh | G06F 9/5061 709/220 |
| 2012/0330991 | A1* | 12/2012 | Babka | G06F 16/219 707/765 |
| 2013/0198857 | A1* | 8/2013 | Maier | G06F 21/60 726/27 |
| 2014/0156684 | A1* | 6/2014 | Zaslavsky | G06F 16/242 707/756 |
| 2015/0350021 | A1* | 12/2015 | Morris | H04L 41/0816 709/224 |
| 2017/0317876 | A1* | 11/2017 | Larson | H04L 41/085 |
| 2018/0041385 | A1* | 2/2018 | Hallivuori | H04L 41/0813 |
| 2018/0046675 | A1* | 2/2018 | Zhou | G06F 16/24545 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
VMware: "Deploy an OVF Template", captured on Dec. 8, 2017, 3 pages.
VMware: "OVF Tool User Guide: VMware OVF Tool 1.0", 2009, 28 pages.
VMware: "VMware vCenter Operations Manager Getting Started Guide: vSphere User Interface vCenter Operations Manager 5.6", released on Nov. 29, 2012, 113 pages.
VMware: "VMware vSphere 4—ESX and vCenter Server Documentation Center", 2009, 1 page.
Cano, I. et al., "Curator: Self-Managing Storage for Enterprise Clusters", *14th USENIX Symposium on Networked Systems Design and Implementation, NSDI '17*, (Mar. 27, 2017).

* cited by examiner

METHODS FOR SYNCHRONIZING CONFIGURATIONS BETWEEN COMPUTING SYSTEMS USING HUMAN COMPUTER INTERFACES

RELATED APPLICATIONS

The present application claims the benefit of priority to U.S. Provisional Patent Application Ser. No. 62/432,585 titled "ESTABLISHING AND CONFIGURING A DYNAMICALLY-GENERATED SERVICE PORTAL USING A HUMAN-COMPUTER INTERFACE", filed Dec. 11, 2016, which is hereby incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

This disclosure relates to computing system management, and more particularly to techniques for feedback-driven computer-aided computer system configuration mapping.

BACKGROUND

A computing system might comprise a logically bounded set of nodes associated with a certain set of users. From time to time new computing equipment is often installed in existing computing environments to expand the computing resources available to users of the existing computing systems. The existing computing systems have a wealth of configuration information describing their respective users and/or environments. The user information (e.g., user roles, user permissions, etc.), for example, might be used to manage access to the resources (e.g., data, services, etc.) in an existing computing environment. Also, the environment information might describe various virtualized entities (e.g., virtual machines, executable containers, etc.), network interfaces, data storage (e.g., virtual disks) information, and/or other information in the existing computing environment.

Unfortunately, configuration information from an existing computing system may not be easily accessible and/or may not be structured for use by newly installed computing equipment. Often, the newly installed computing equipment has processes and/or capabilities that depend on configuration information being presented in a particular form (e.g., object versus text value) or format (e.g., UTF-8 versus ASCII) or representation that is different than the representation that is used in the existing computing environment. This can happen when the newly installed computing equipment is of a different type than the existing computing system (e.g., a different vendor or different operating system, etc.). In such cases, merely copying the configuration information (e.g., user information, environment information, etc.) from the existing computing environment to the newly installed computing equipment will fail to properly and fully configure the newly installed equipment.

Even in the case where some of the configuration data can be copied over, there are frequently situations where the new computing equipment supports new capabilities that are not present in the existing computing environment. Moreover, newly installed computing equipment might need to rely on or refer to the existing computing environment as an ongoing source of truth for certain dynamic configuration information (e.g., user roles changes, new user additions, etc.). Merely copying data from one system to another system will not address this need. What is needed is a technological solution that efficiently establishes and dynamically updates the configuration information of the new computing equipment in a manner that facilitates initial and ongoing operation of the newly installed computing equipment.

Some of the approaches described in this background section are approaches that could be pursued, but not necessarily approaches that have been previously conceived or pursued. Therefore, unless otherwise indicated, it should not be assumed that any of the approaches described in this section qualify as prior art merely by their inclusion in this section.

SUMMARY

The present disclosure describes techniques used in systems, methods, and in computer program products for feedback-driven computer-aided computer system configuration mapping, which techniques advance the relevant technologies to address technological issues with legacy approaches. More specifically, the present disclosure describes techniques used in systems, methods, and in computer program products for dynamically mapping configuration information between computing environments. Certain embodiments are directed to technological solutions for dynamically mapping the configuration information of an existing computing environment to the configuration information of a new computing equipment to facilitate operation of the new computing equipment.

The disclosed embodiments modify and improve over legacy approaches. In particular, the herein-disclosed techniques provide technical solutions that address the technical problems attendant to efficient handling of the configurations of computing systems installed in a dynamically-changing computing environment. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. More specifically, the herein-disclosed technical solutions for dynamic transformation of configuration information between different computing systems improves computer functionality, both at the time of an initial deployment of new computing equipment, and on an ongoing basis. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of human-machine interfaces as well as advances in various technical fields related to hyperconverged computing platform management.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
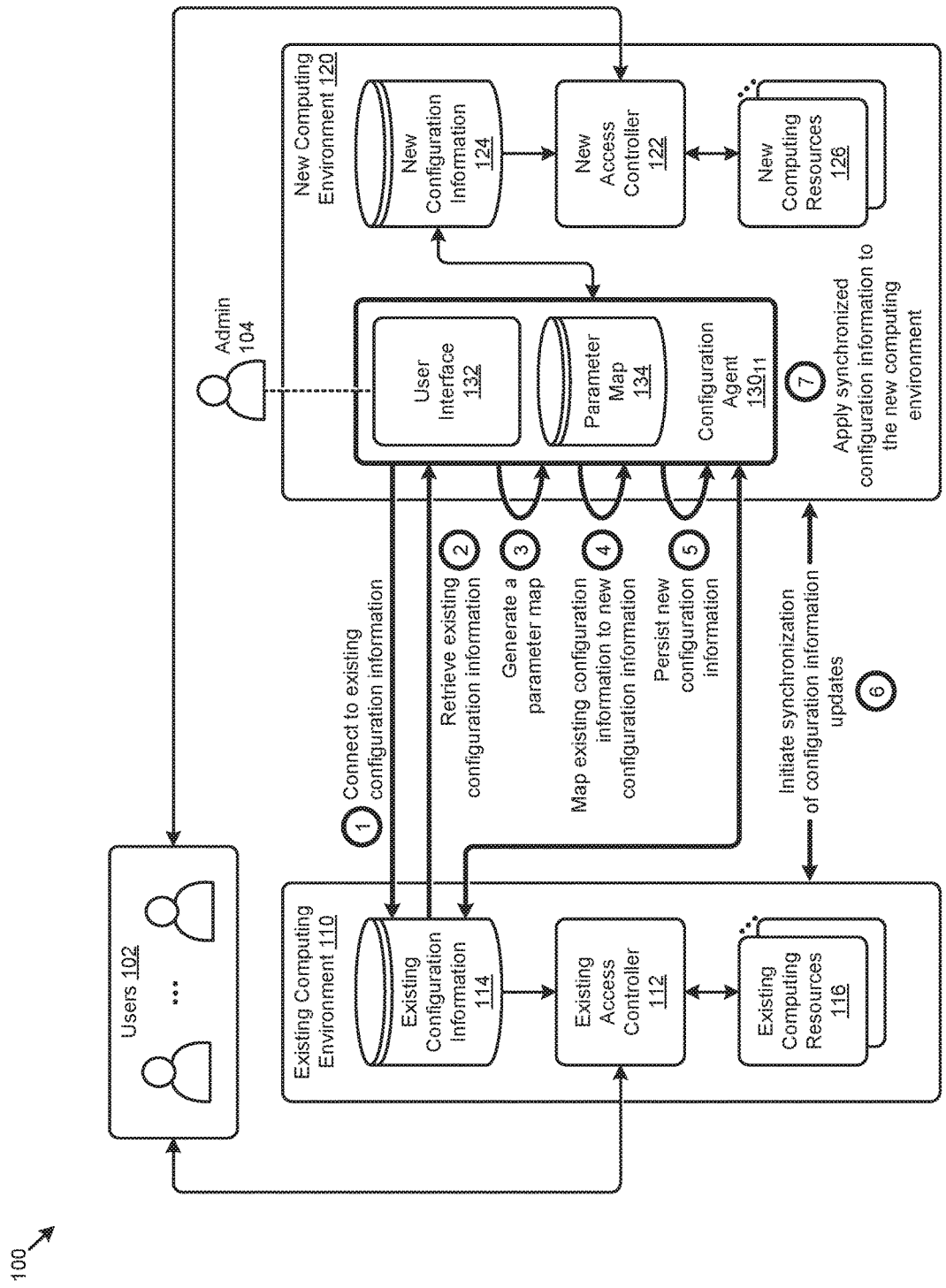
FIG. 1 depicts a computing environment in which embodiments of the present disclosure can be implemented.

Embodiments in accordance with the present disclosure address problems attendant to system-to-system configuration management. Some embodiments include techniques to implement computer-aided system-to-system configuration, which techniques serve to efficiently establish and update the configuration of computing equipment that is newly installed into a dynamically-changing computing environment. Some embodiments are directed to approaches for dynamically mapping the configuration information of an existing computing environment to the configuration information of newly installed computing equipment to facilitate bringing the new computing equipment online. The accompanying figures and discussions herein present example environments, systems, methods, and computer program products for efficiently mapping and persisting configuration information between computing environments.

OVERVIEW

Disclosed herein are techniques for dynamically mapping the configuration information of an existing computing environment to the configuration information of new computing equipment to facilitate configuration and ongoing operation of the new computing equipment. In certain embodiments, the new computing equipment might be installed in an existing computing environment (e.g., site, data center, etc.). A connection from the new computing equipment to the existing computing system is established to access a first set of configuration information that is stored at the existing computing system. A parameter map is generated to map the first set of configuration information to a second set of configuration information associated with the new computing equipment and vice-versa. The second set of configuration information is persisted at the new computing equipment to facilitate configuring and/or operating the new computing equipment.

In certain embodiments, the parameter map is generated based at least in part on user-defined mappings, user guidance, and/or user preferences. In certain embodiments, the parameter map is generated based at least in part on a comparison of data structures (e.g., schemas) used to store configuration information at the respective computing systems. Syntactical and semantic differences that are identified during the comparison are analyzed to generate a parameter map that relates the existing set of configuration parameters to the second set of configuration parameters and vice-versa. In certain embodiments, a second set of configuration information at the new computing equipment is updated based at least in part on changes to the first set of configuration information associated with the existing computing environment.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

DESCRIPTIONS OF EXAMPLE EMBODIMENTS

FIG. 1 depicts a computing environment 100 in which embodiments of the present disclosure can be implemented. As an option, one or more variations of computing environment 100 or any aspect thereof may be implemented in the context of the architecture and functionality of the embodiments described herein.

The computing environment 100 of FIG. 1 comprises an existing computing environment 110 and a new computing environment 120. As an example, the existing computing environment 110 might have been accessed by a set of users 102 some period of time prior to establishment of the new computing environment 120. Access to certain resources (e.g., existing computing resources 116) by the users at the existing computing environment is provisioned by an existing access controller 112 in the existing computing environment. Such access and/or other operations at the existing computing environment are constrained based at least in part on a set of existing configuration information 114 associated with the existing computing environment. For example, the existing configuration information 114 might comprise certain user information such as the respective roles, permissions, and/or groups assigned to the users 102. The existing configuration information might also comprise data (e.g., metadata) describing certain characteristics of the environment and/or entities (e.g., virtual machines, virtual disks, virtual networks, virtual network connections, executable containers, etc.) within or accessible to the existing computing environment.

As earlier mentioned, the new computing environment 120 might be implemented after the existing computing environment 110 has been in operation for some period of time. For example, the new computing environment might be established to expand the computing resources available to the users 102 of the existing computing environment. A system administrator (e.g., admin 104) of the new computing environment might want to access the wealth of existing configuration information 114 to facilitate implementation and/or operation of the new computing environment. However, the existing configuration information from the existing computing environment may not be accessible and/or may not be structured for use by the new computing environment.

The herein disclosed techniques address the problems attendant to the handling of configuration information over heterogenous computing environments by dynamically mapping the existing configuration information 114 of the existing computing environment 110 to the new configuration information 124 of the new computing environment 120 to facilitate operation of the new computing environment.

In the shown embodiment of FIG. 1, a connection from the new computing environment to the existing computing environment is established to access the existing configuration information 114 (operation 1). For example, the connection might be established by interactions of admin 104 with a user interface 132 associated with a configuration agent $130_{11}$ operating in the new computing environment. The existing configuration information and/or other information (e.g., user preferences, etc.) are retrieved (operation 2) to facilitate generation of a parameter map 134 (operation 3). The parameter map 134 is used to map the existing configuration information to the new configuration information 124 (operation 4). The new configuration information 124 is persisted at the new computing environment 120 (operation 5).

As time progresses, changes to existing configuration information might occur as a result of activities in the existing computing environment. In such cases, and upon such occurrences, a synchronization capability serves to synchronize information updates in response to the specific changes to the existing configuration information (operation 6). In some cases, the synchronization capability serves to synchronize information updates in response to specific changes to configuration information of the new computing environment (operation 6). The synchronize information is applied in the new computing environment (operation 7) and/or to configuration information of the existing computing environment. The synchronization process continues to operate to perform ongoing synchronization in response to specific events. For example, new configuration information might be exchanged when provisioning access by users to various instances of new computing resources 126 in the new computing environment. In some cases, an instance of a new access controller 122 might provide feedback to a user or users. This can occur when the configuration agent fails to relate one or more portions of the existing configuration information to the new configuration information. Various configuration mapping techniques can be used to reduce the occurrence of failures when relating the existing configuration information to the new configuration information.

One such technique for performing configuration mapping between computing environments is disclosed in further detail as follows.

Figure 2:
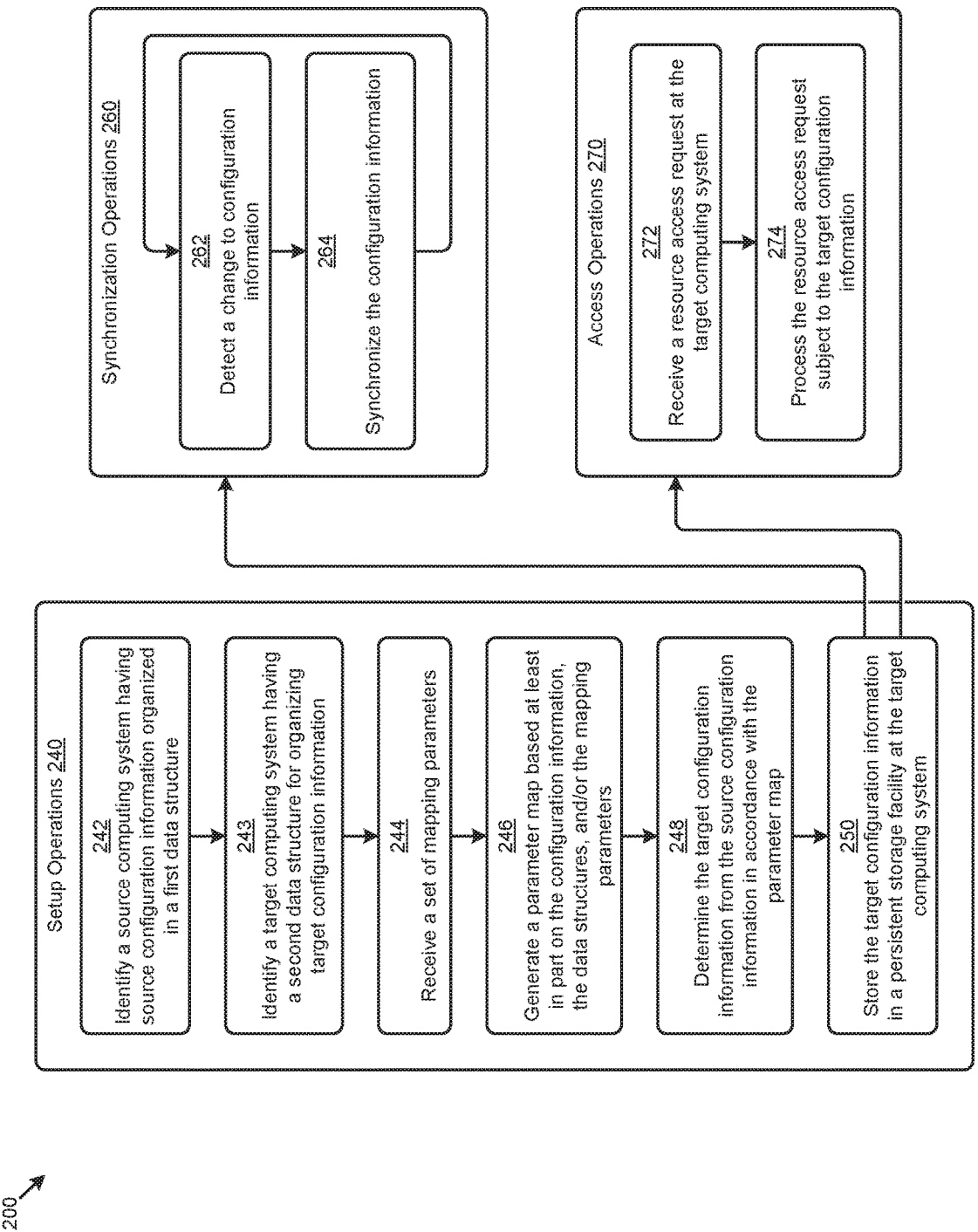
FIG. 2 depicts a configuration mapping technique as implemented in systems that perform efficient transfer of configuration information between computing environments, according to an embodiment.

FIG. 2 depicts a configuration mapping technique 200 as implemented in systems that perform efficient transfer of configuration information between computing environments. As an option, one or more variations of configuration mapping technique 200 or any aspect thereof may be implemented in the context of the architecture and functionality of the embodiments described herein. The configuration mapping technique 200 or any aspect thereof may be implemented in any environment.

The configuration mapping technique 200 presents one embodiment of certain steps and/or operations that dynamically map configuration information between computing environments to facilitate configuration and/or operation of computing systems in the environments. As shown, the steps and/or operations can be grouped in a set of setup operations 240, a set of synchronization operations 260, and a set of access operations 270.

As illustrated, the setup operations 240 can commence by identifying a source computing system having a set of source configuration information organized in a first data structure (step 242). The first data structure comprises configuration information that will be converted over to the newly-installed system. A target computing system having a second data structure for organizing a set of target configuration information is also identified (step 243) The data in the second data structure comprises initial configuration information of the target that will be augmented with converted-over configuration data. In some cases, the first data structure and/or the second data structure might comprise multiple related or unrelated data structures. A set of mapping parameters pertaining to the computing systems is received (step 244). As an example, at least some of the mapping parameters might associate certain fields of the first data structure with certain fields of the second data structure. A parameter map is generated based at least in part on the configuration information, the data structures, and/or the mapping parameters (step 246). For example, the parameter map might codify the field mapping as described in the foregoing mapping parameter example. At least portion of the target configuration information is determined from the source configuration information in accordance with the parameter map (step 248). The target configuration information is then stored in a persistent storage facility at the target computing system (step 250).

The synchronization operations 260 can synchronize the source configuration information and target configuration information by detecting a change to the source configuration information (step 262). The target configuration information is updated by applying the detected change to the parameter map (step 264). For example, a change to a user role data record stored in a first field in the first data structure of the source configuration information can invoke an update to the user role data record stored in a second field in the second data structure of the target configuration information in accordance with the parameter map.

As earlier described, the target configuration information derived from the source configuration information can facilitate execution of certain operations at the target computing system. The access operations 270 depict a representative example of such operations. Specifically, the access operations describe receiving a resource access request at the target computing system (step 272). The resource access request is processed at the target computing system subject to the target configuration information (step 274). For example, user roles and/or permissions stored in the target configuration information might be used to restrict access to certain resources (e.g., data, services, etc.) in the target computing system.

Figure 3:
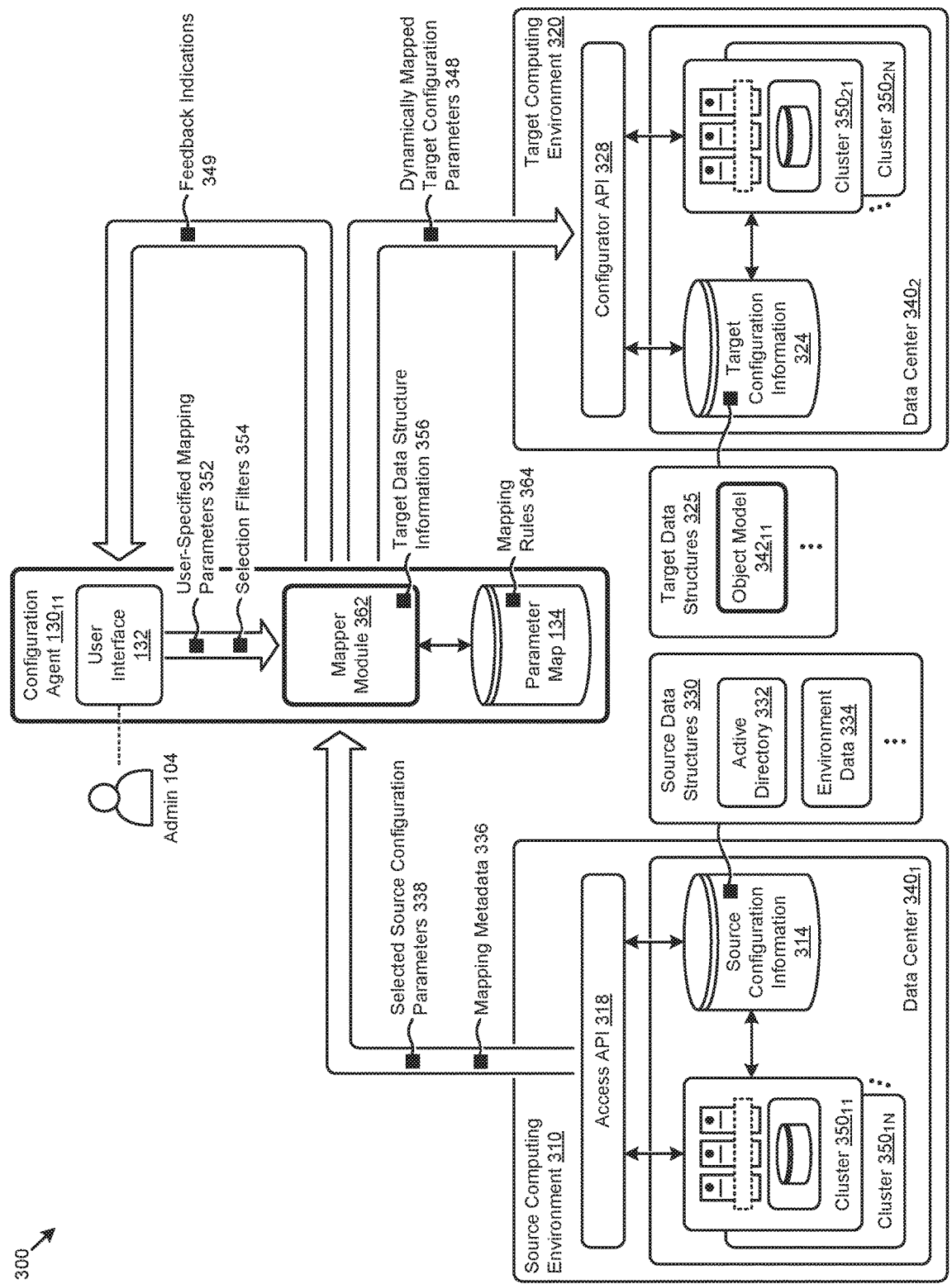
FIG. 3 depicts a multi-cluster layout in which a configuration agent is deployed for efficient transfer of configuration information between computing environments, according to an embodiment.

A system for implementing any of the herein disclosed techniques is disclosed as pertains to FIG. 3.

FIG. 3 depicts a multi-cluster layout 300 in which a configuration agent is deployed for efficient transfer of configuration information between computing environments. As an option, one or more variations of components within the multi-cluster layout 300 or any aspect thereof may be implemented in the context of the architecture and functionality of the embodiments described herein.

The embodiment shown in FIG. 3 is merely one example of a system that facilitates efficient transfer of configuration information between computing environments according to the herein disclosed techniques. The multi-cluster layout 300 comprises components within a source computing environment 310 as well as components within a target computing environment 320. The source computing environment 310 has a data center $340_1$ that includes a plurality of clusters (e.g., cluster $350_{11}$, ..., cluster $350_{1N}$). A set of source configuration information 314 at the data center $340_1$ codifies the configuration of the data center, the clusters in the data center, and/or other components (e.g., entities) of the clusters and/or data center. The source configuration information 314 might also be accessed to facilitate certain operations (e.g., resource access, etc.) performed at the data center and/or its clusters. As shown, the source configuration information is codified in a set of source data structures 330. For example, the source data structures 330 might comprise an active directory 332 (e.g., to store user information such as roles, permissions, etc.), a set of environment data 334 (e.g., to store entity attributes, etc.), and/or other data structures.

In the shown embodiment, the target computing environment 320 might also have a data center $340_2$ that includes a plurality of clusters (e.g., cluster $350_{21}$, ..., cluster $350_{2N}$). A set of target configuration information 324 at the data center $340_2$ codifies the configuration of the data center, the clusters in the data center, and/or other components (e.g., entities) of the clusters and/or data center. The target configuration information 324 might also be accessed to facilitate certain operations (e.g., resource access, etc.) performed at the data center and/or its clusters. As shown, the target configuration information is codified in a set of target data structures 325. For example, the target data structures 325 might comprise an object model $342_{11}$ (e.g., to store information pertaining to users, roles, projects, entities, etc.), and/or other data structures. As can be observed, the target data structures 325 at the target computing environment are different from the source data structures 330 at the source computing environment. Moreover, the data (e.g., parameters) stored in the respective data structures might be determined based at least in part on a respective syntax implemented at each environment.

A configuration agent $130_{11}$ is implemented to facilitate an efficient exchange of configuration information between the source computing environment 310 and the target computing environment 320. As shown, a mapper module 362 in the configuration agent $130_{11}$ receives certain user-specified information derived from interactions between a user (e.g., admin) and a user interface 132 associated with the configuration agent. Specifically, an admin might interact with a user interface to submit a set of user-specified mapping parameters 352 and/or a set of selection filters 354 to the mapper module 362. As an example, the user-specified mapping parameters 352 might define a set of predetermined associations between data fields in the source data structures 330 and data fields in the target data structures 325. In some cases, a set of mapping metadata 336 might be received from the source computing environment to influence certain operations (e.g., filtering, mapping, etc.) at the mapper module and/or the configuration agent. The mapping metadata is any codification of any information (e.g., filter, map, rule, operator, operand, etc.) that is used to influence the conversion of data from the existing computing environment to the new computing environment.

The selection filters 354 received at the mapper module 362 might be applied to the source configuration information to select a portion of the information (e.g., subset of users) for transfer and/or mapping to the target configuration information.

More specifically, the mapper module 362 might receive a set of selected source configuration parameters 338 from the source configuration information through an access API 318 in the source computing environment. The mapper module 362 uses the aforementioned received information (e.g., user-specified mapping parameters 352, selection filters 354, mapping metadata 336, and/or selected source configuration parameters 338), certain information about the target environment (e.g., target data structure information 356), and/or other information to generate the parameter map 134.

In certain embodiments, the parameter map 134 comprises a set of mapping rules 364 that relate (e.g., map) the selected source configuration parameters 338 to a set of dynamically mapped target configuration parameters 348. The dynamically mapped target configuration parameters 348 generated by the mapper module of the configuration agent $130_{11}$ are consumed by the target computing environment 320 through a configurator API 328. In some cases, the dynamically mapped target configuration parameters 348 might be used to initially configure the one or more of the clusters in the data center $340_2$. In other cases, the dynamically mapped target configuration parameters might comprise merely the target configuration parameters that correspond to one or more changes to the source configuration information.

The mapper module 362 may access historical data, user preferences, and other user-specific information so as to dynamically validate a prospective parameter map 134 against any then-current characteristics of the computing cluster. In some validation scenarios, the user is prompted to confirm, adjust, or reject incompatible parameter states. In some cases, validation includes then-current "runtime states" that might include settings or characteristics of the target system. For example, a network interface configuration such as the IP address of a domain name server (DNS) that was used in the source environment might not be compatible with network interfacing capabilities at the target environment. In this particular case, the user might be prompted to select from a list of available alternative domain name servers that are available from the target system. The mapper module 362 implements many heuristics pertaining to particular parameters in the parameter maps.

In some situations, even after application of the aforementioned heuristics and/or validation steps, the module mapper is unable to relate the source configuration information 314 (e.g., source configuration parameters) to the target configuration information 324 (e.g., target configuration parameters). Such a failure might be due to a mismatch of data types or a mismatch between syntax, or a mismatch pertaining to the underlying semantics of a particular item of information and/or its representation as a parameter. In such cases, when the module mapper fails to locally rectify a mismatch, the module mapper might supply feedback information to the self-service portal so as to initiate further interaction with the user.

Specifically, a generating step of the module mapper raises a signal that invokes local remediation (e.g., if there are heuristics to apply and/or if there are multiple mapping options to be considered). If local remediation is unsuccessful, the mapper module sends feedback indications 349 to the "self-service portal" (SSP). The SSP in turn offers the user an opportunity to change user-specified mapping parameters 352, and/or selection filters 354, and/or other directives, and then tries parameter mapping again in the expectation of a successful mapping. Strictly as one specific example, if the source environment relied on network interfacing to a source network known as "VLAN123", and if the target environment did not have access to "VLAN123", then default mapping would not be successful. Specific feedback indications (e.g., to remediate the network interfacing) is provided to the self-service portal so as to initiate further interactions with the user as regards to a user-selection of network connections that are available in the target environment.

Regarding the aforementioned heuristics and their use in validation, many of the determined mapping values are generated with then-current values taken from both the source environment and the target environment. Remediation often involves presenting combinations of the then-current values taken from the source environment and the target environment on the same display interface such that the user has the full context for aiding the remediation. In some cases, the heuristics are sufficiently configured to be able to present remediation recommendations to the user. For example, a single display interface might display to the user that virtual machine "A" and virtual machine "B" were using source network "VLAN123" to communicate with virtual machine "C", and that a recommended mapping value for the target environment network interfacing is for virtual machine "A" and virtual machine "B" to use the available target network "VMNetwork" to communicate with virtual machine "C".

The foregoing discussion of FIG. 3 describes techniques (e.g., implemented at mapper module 362) that map configuration parameters between heterogenous data structures. Such techniques are disclosed in further detail as follows.

Figure 4:
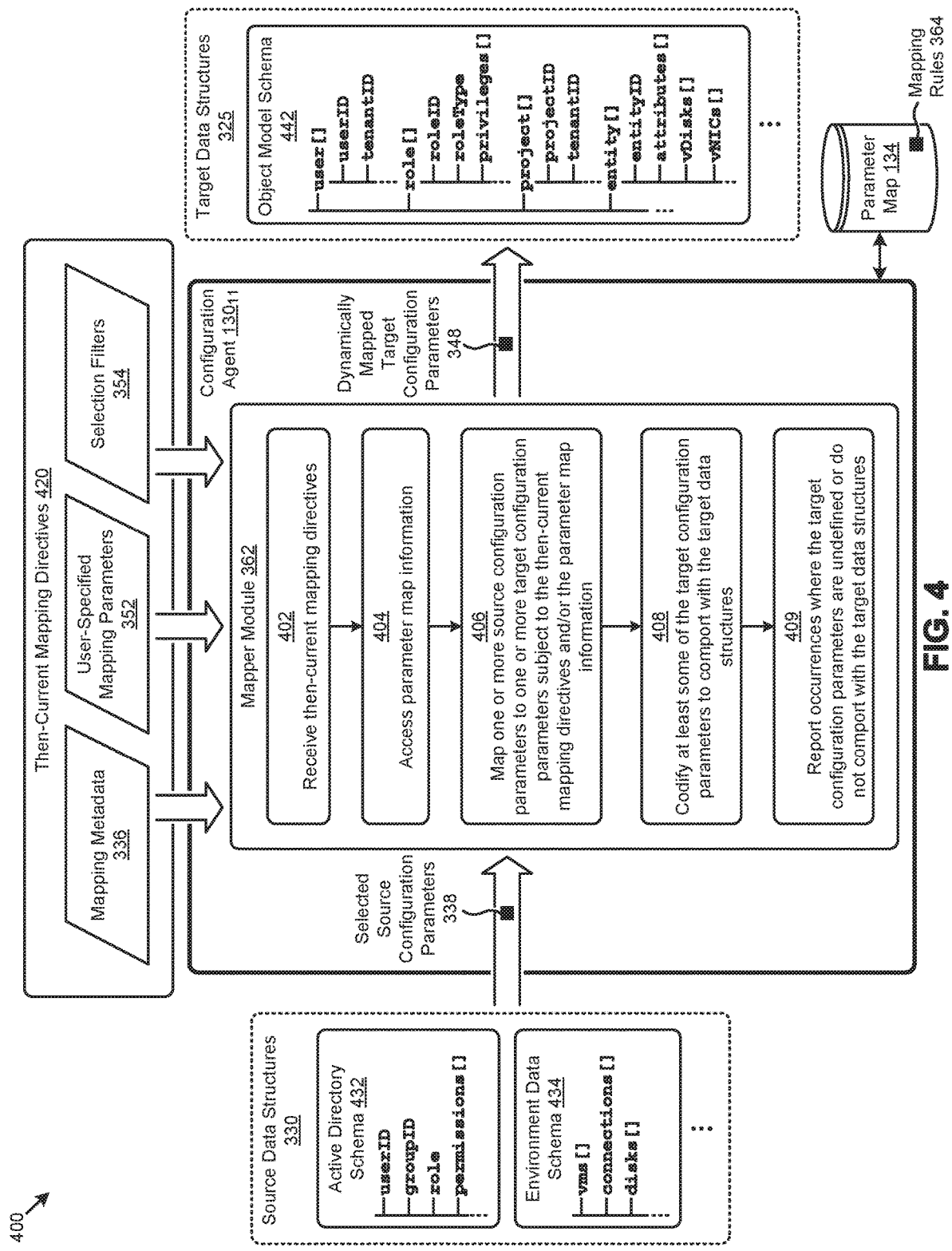
FIG. 4 presents a configuration parameter mapping technique as implemented in systems that facilitate efficient exchange of configuration information between computing environments, according to an embodiment.

FIG. 4 presents a configuration parameter mapping technique 400 as implemented in systems that facilitate efficient exchange of configuration information between computing environments. As an option, one or more variations of configuration parameter mapping technique 400 or any aspect thereof may be implemented in the context of the architecture and functionality of the embodiments described herein. The configuration parameter mapping technique 400 or any aspect thereof may be implemented in any environment.

The configuration parameter mapping technique 400 presents one embodiment of certain steps and/or operations that map configuration parameters between the different data structures of respective computing environments. Specifically, the configuration parameter mapping technique 400 can be implemented in a mapper module 362 of a configuration agent $130_{11}$ to map configuration parameters from a set of source data structures 330 to a set of target data structures 325. The source data structures 330 and/or the target data structures 325 can organize and/or store configuration information and/or other information using various techniques. For example, an active directory schema 432 associated with the source data structures indicates the information (e.g., in an active directory) might be organized and/or stored in a tabular structure (e.g., relational database table) that has rows that relate various user attributes with a particular user. As another example, the information might be organized and/or stored in a programming code object that has instances corresponding to a particular user and properties corresponding to the various attributes associated with the user.

As depicted in active directory schema 432, a data record (e.g., table row or object instance) for a particular user might describe a user identifier (e.g., stored in a "userID" field), a group identifier (e.g., stored in a "groupID" field), a role description (e.g., stored in a "role" field), a set of permissions (e.g., stored in a "permissions [ ]" object), and/or other user attributes. The source data structures 330 might further organize and/or store certain environment information according to an environment data schema 434. As depicted in environment data schema 434, the environment information might comprise data records that describe certain environment entities, such as a set of virtual machines (e.g., stored in a "vms [ ]" object), a set of connections (e.g., stored in a "connections [ ]" object), a set of virtual disks (e.g., stored in a "disks [ ]" object), and/or other environment entities.

As can be observed, the target data structures 325 are different as compared to the source data structures 330. Specifically, the target data structures might organize configuration information in accordance with an object model schema 442. The object model schema 442 might comprise a "user [ ]" object that stores a user identifier (e.g., stored in a "user ID" property), a tenant identifier (e.g., stored in a "tenant ID" property), and/or other user properties. The object model schema might further comprise a "role [ ]" object that stores a role identifier (e.g., stored in a "role ID" property), a role type description (e.g., stored in a "roleType" property), a set of privileges (e.g., stored in a "privileges[ ]" object), and/or other role properties. A "project[ ]" object might also be included in the object model schema 442 that stores a project identifier (e.g., stored in a "projectID" property), a tenant identifier (e.g., stored in a "tenantID" property), and/or other project properties. The object model schema 442 might also comprise an "entity[ ]" object that stores an entity identifier (e.g., stored in a "entityID" property), a set of entity attributes (e.g., stored in an "attributes[ ]" object), and/or virtual disks (vDisks), and/or virtual network interfaces (vNICs), and/or other entity properties. Other objects can be included in the data structure described by the object model schema 442.

To facilitate mapping configuration parameters between the aforementioned different types of data structures (e.g., source data structures 330 and target data structures 325), the mapper module 362 receives a set of then-current mapping directives (step 402). For example, the then-current mapping directives 420 might comprise mapping metadata 336, user-specified mapping parameters 352, selection filters 354, and/or other directives. Certain parameter map information is accessed (step 404), and parameter mapping rules might be invoked. Specifically, mapper module 362 might access a parameter map 134 that comprises a set of mapping rules 364, any one or more of the mapping rules being invoked over one or more configuration parameters. Using such invocations, or other application of the mapping rules, the one or more source configuration parameters (e.g., selected source configuration parameters 338) are mapped to the one or more target configuration parameters (e.g., dynamically mapped target configuration parameters 348) subject to the then-current mapping directives and/or any other aspects of the parameter map information (step 406).

The mapped target configuration parameters are organized and stored in accordance with the target data structures (step 408). For example, the source parameter might be stored in a format that active directory schema 432, and mapped into the syntax and semantics that comport with an applicable object model schema 442.

In some cases, the mapped target configuration parameters are undefined, or do not comport with the target data structures, or are not accessible, or are not modifiable, etc. In such cases, step 409 serves to provide feedback to the user via a user interface. The user can then take steps to make changes to facilitate a subsequent validation of an instance of the parameter map. Strictly as examples, the user can operate the SSP to make modifications to any or all of the mapping metadata, and/or the user-specified mapping parameters, and/or selection filters.

The aforementioned user specification and/or manipulation of source configuration information and/or desired target configuration information can be facilitated by user interactions with a user interface. Examples of such user interfaces are disclosed in detail as follows.

FIG. 5A through FIG. 5H depict a user interaction scenario 500 for importing configuration information in systems that facilitate efficient handling of configuration information between computing environments. As an option, one or more variations of user interaction scenario 500 or any aspect thereof may be implemented in the context of the architecture and functionality of the embodiments described herein. The user interaction scenario 500 or any aspect thereof may be implemented in any environment.

Figure 5A:
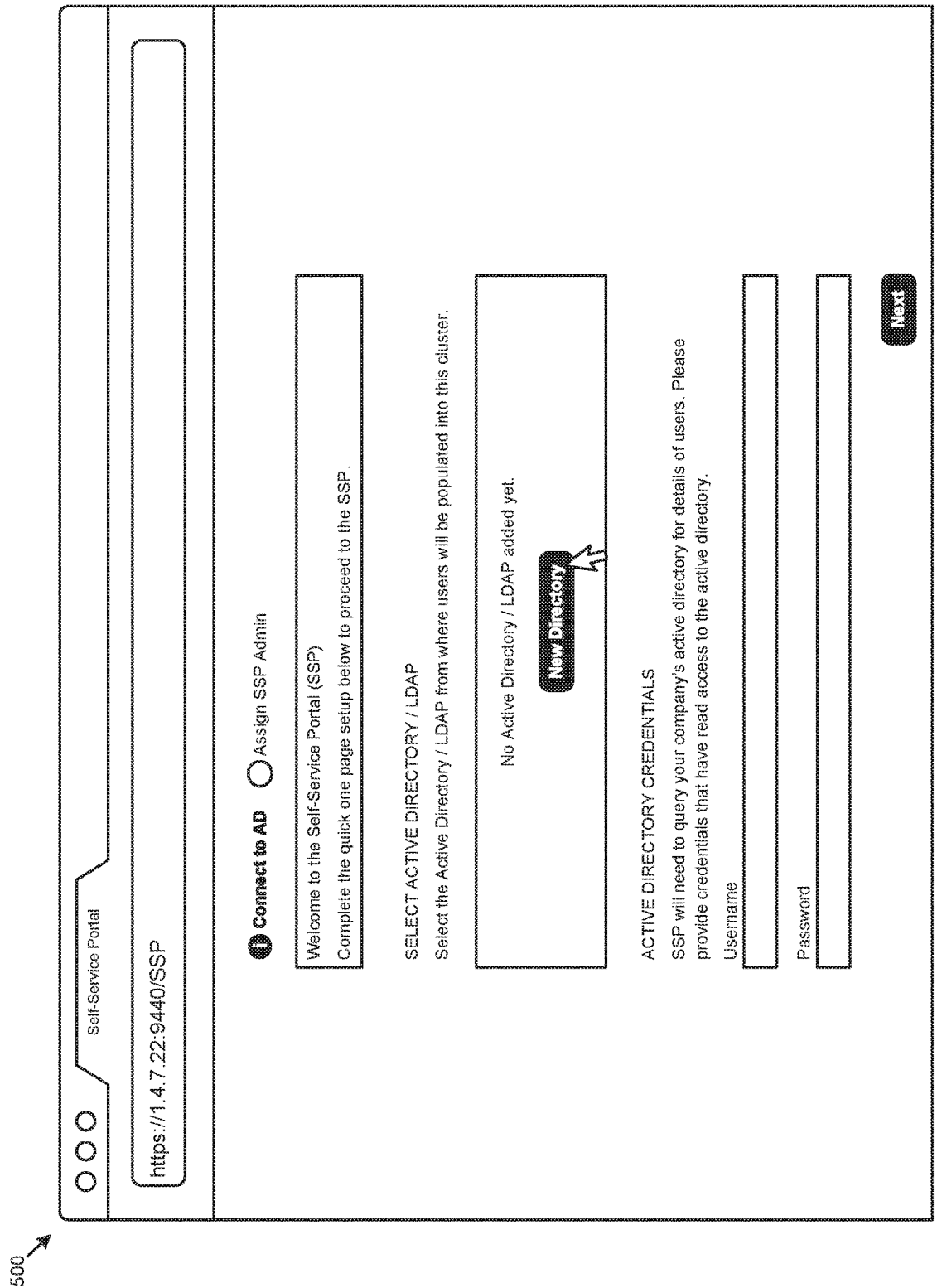
FIG. 5A, FIG. 5B, FIG. 5C, FIG. 5D, FIG. 5E, FIG. 5F, FIG. 5G, and FIG. 5H depict a user interaction scenario for importing configuration information in systems that facilitate efficient exchange of configuration information between computing environments, according to an embodiment.

FIG. 5A through FIG. 5H depict a selected sequence of example user interface views that facilitate the execution of the user interaction scenario 500. As can be observed, the user interface views might be presented to a user in a web page rendered by a browser. As an example, the browser might be accessed from a target computing environment. Specifically, FIG. 5A presents a self-service portal (SSP) to a user that facilitates establishing a connection to a set of source configuration information (e.g., at an "Active Directory" or "Lightweight Directory Access Protocol" (LDAP) data source). The user can commence establishment of such a directory connection by clicking "New Directory".

Figure 5B:
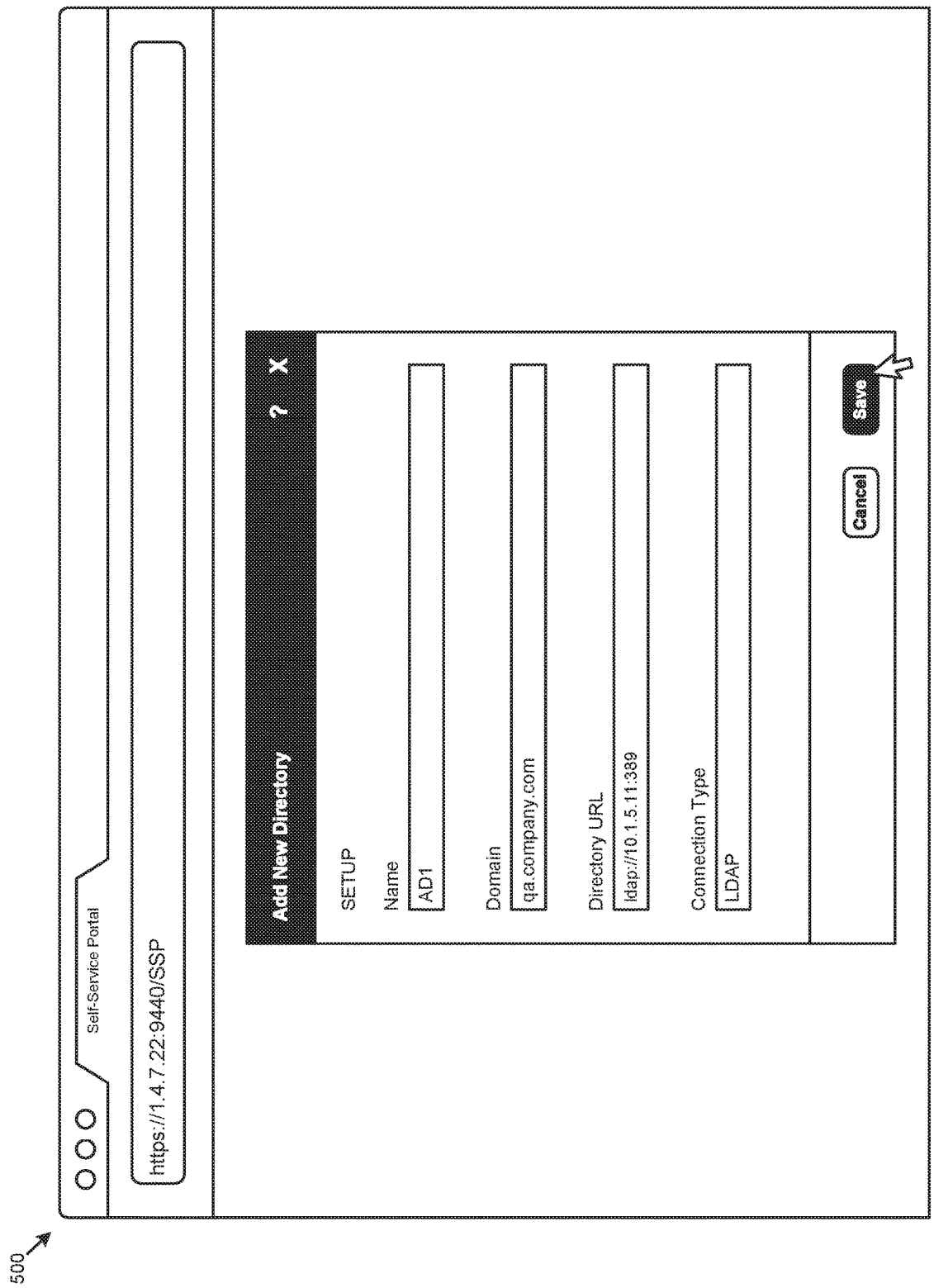

Referring to FIG. 5B, the SSP invokes a user interface that is configured to accept user input of (1) a location of a folder or directory where the source configuration information is stored, and (2) a URL that comprises a specification of a protocol to access the first set of configuration parameters at the specified folder or directory. As shown, the user can use screen devices of the user interface to specify still further attributes pertaining to the directory or folder and/or other characteristics pertaining to privilege(s) and/or location(s) and/or protocol(s) as may be used for accessing the source configuration information. In the specific example shown, the user specifies a directory "Name" (e.g., "AD1", a "Domain" (e.g., "qa.company.com"), a "Directory URL" (e.g., "ldap://10.1.5.11:389"), a "Connection Type" (e.g., "LDAP"), and/or other access attributes. In the foregoing example, the "ldap:" protocol portion of the URL refers to the lightweight directory access protocol of the Internet Engineering Task Force (IETF). When the attributes are entered, the user clicks "Save".

Figure 5C:
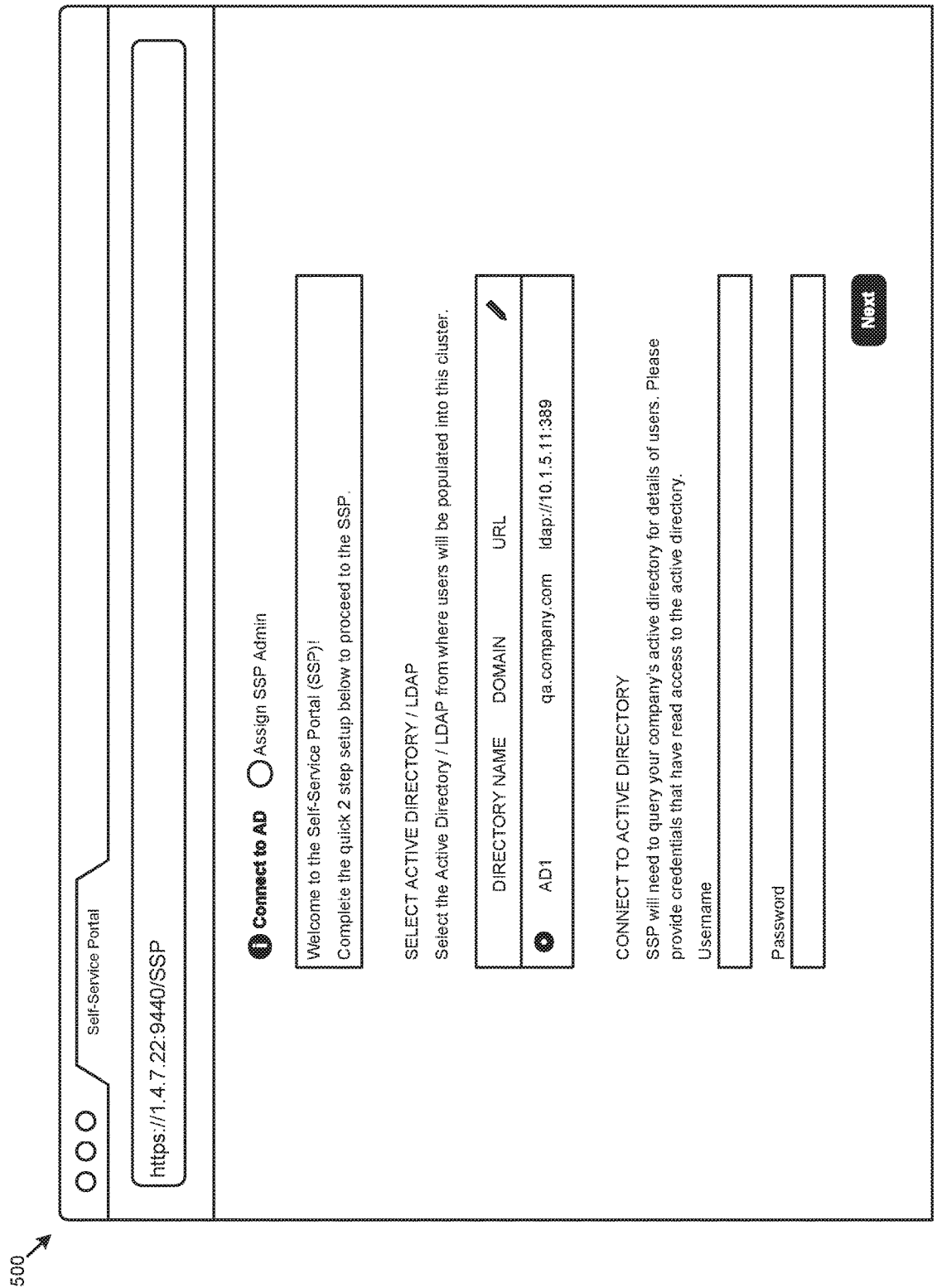
Figure 5D:
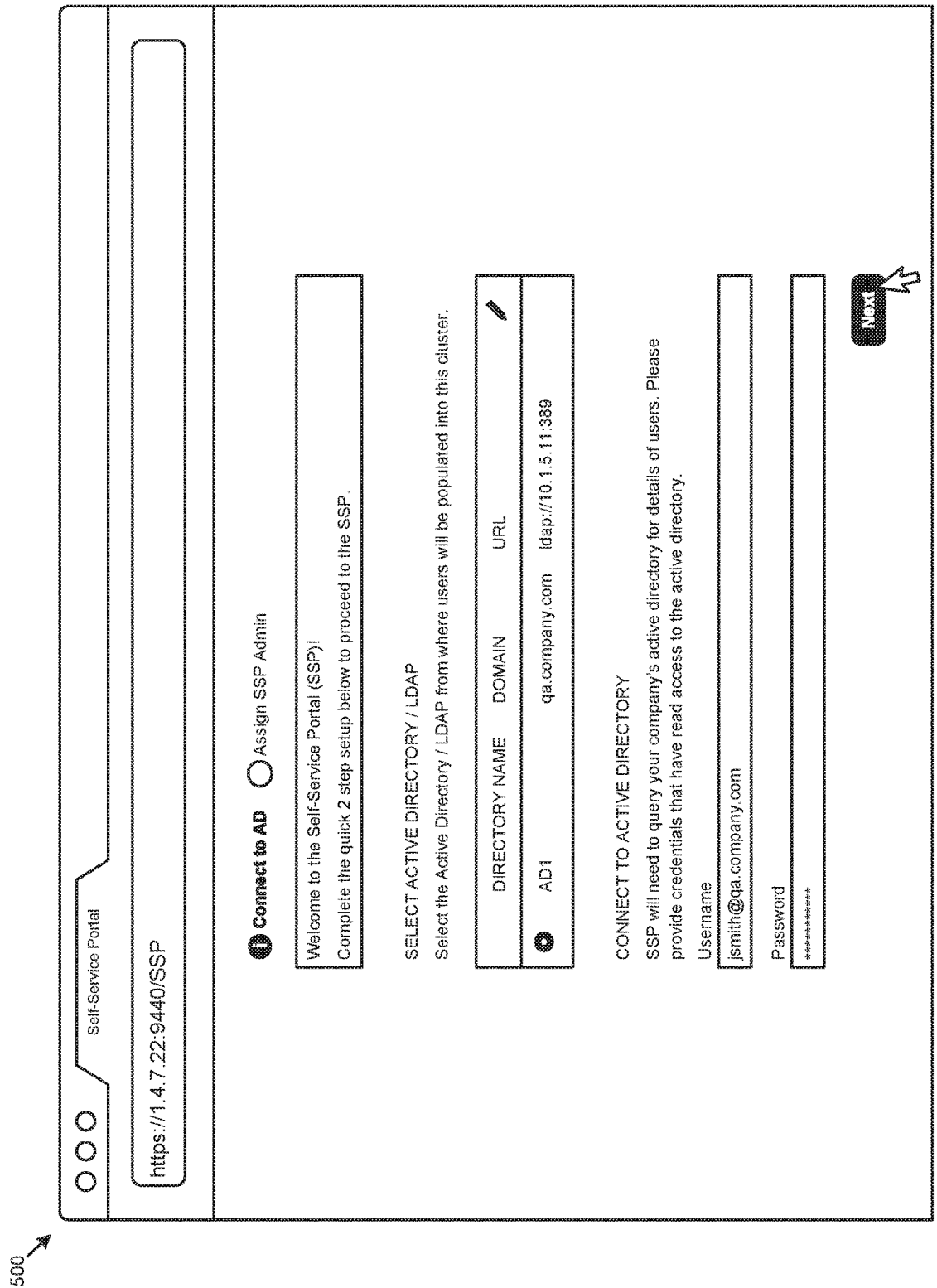

In the user interface view of FIG. 5C, the earlier specified directory attributes are displayed. The user interaction scenario 500 continues with the user entering or confirming directory connection authorization credentials (e.g., "Username" and "Password") as shown in FIG. 5D. A subroutine or process or API is called to invoke formation of the connection. Collection of additional user input continues by clicking a "Next" button.

Figure 5E:
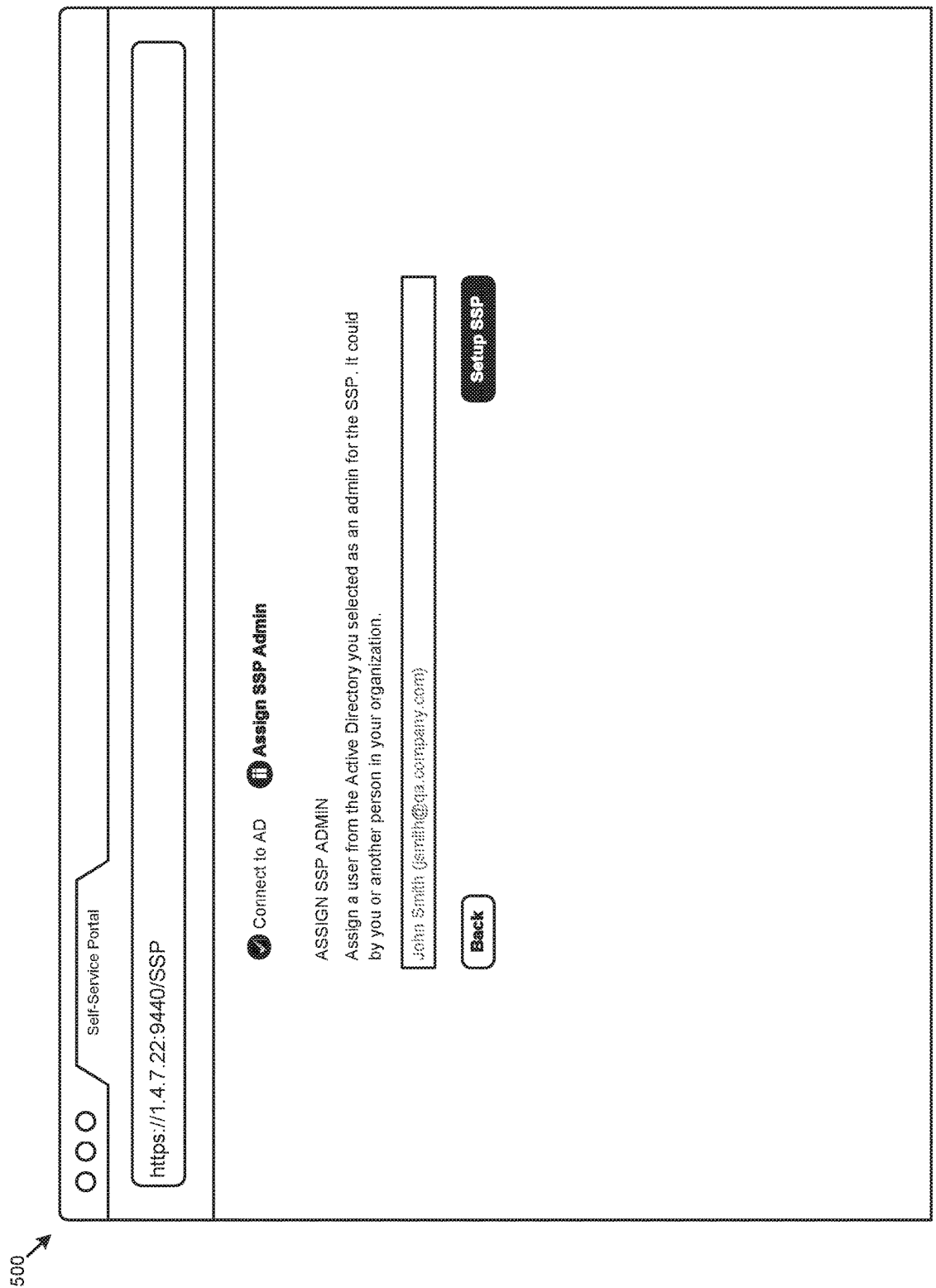

Referring to FIG. 5E, when a successful connection to the source configuration information such as a user directory (e.g., "Active Directory" (AD)) is established, the user can assign one of the users from the AD to be an administrator for the SSP. As shown, the administrator name text box might be prepopulated with the then-current user name.

Figure 5F:
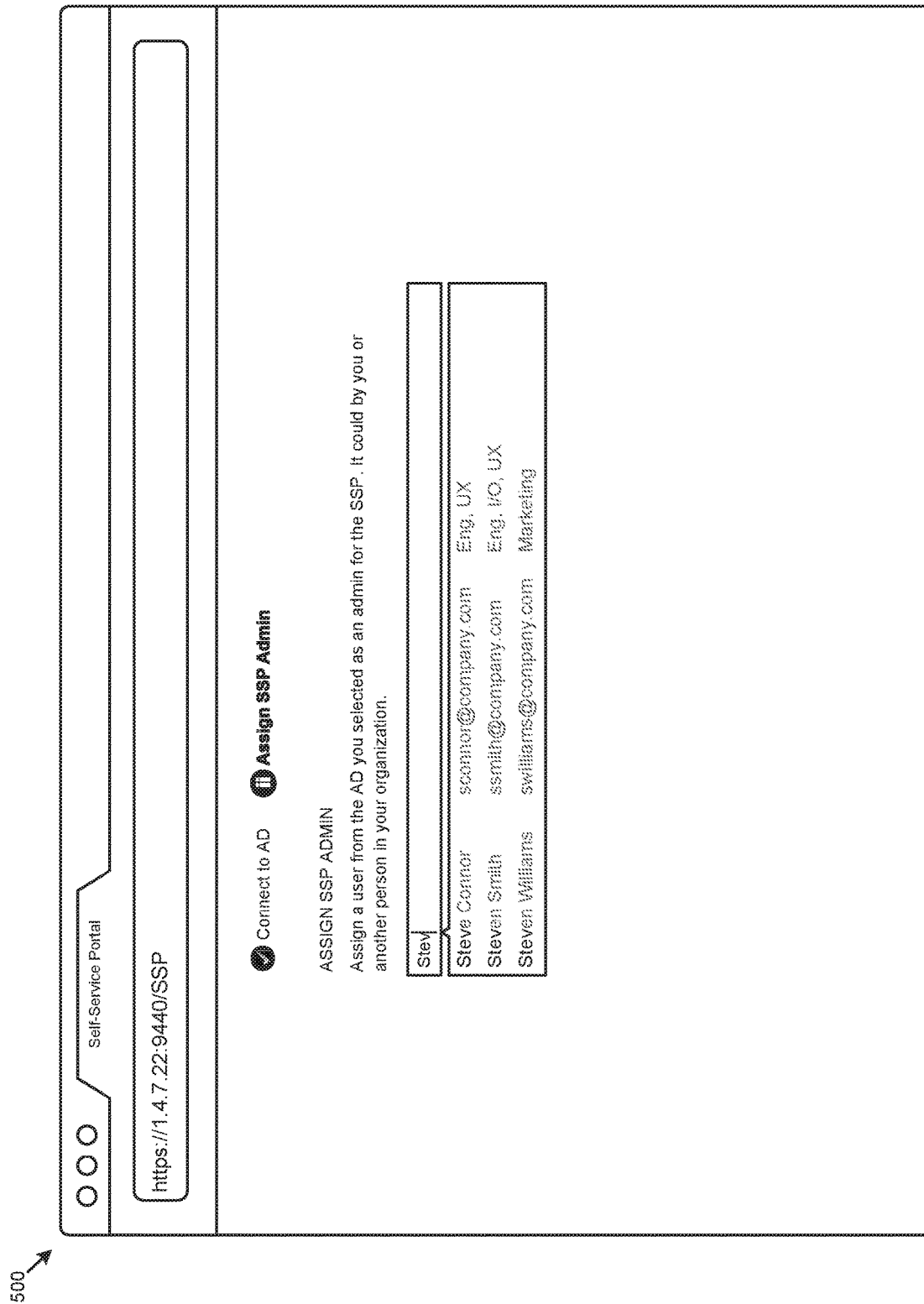

If some user other than the then-current user is to be assigned as the administrator, then the then-current user specifies the name of the other user by typing the other user's name in the text box as depicted in FIG. 5F.

Figure 5G:
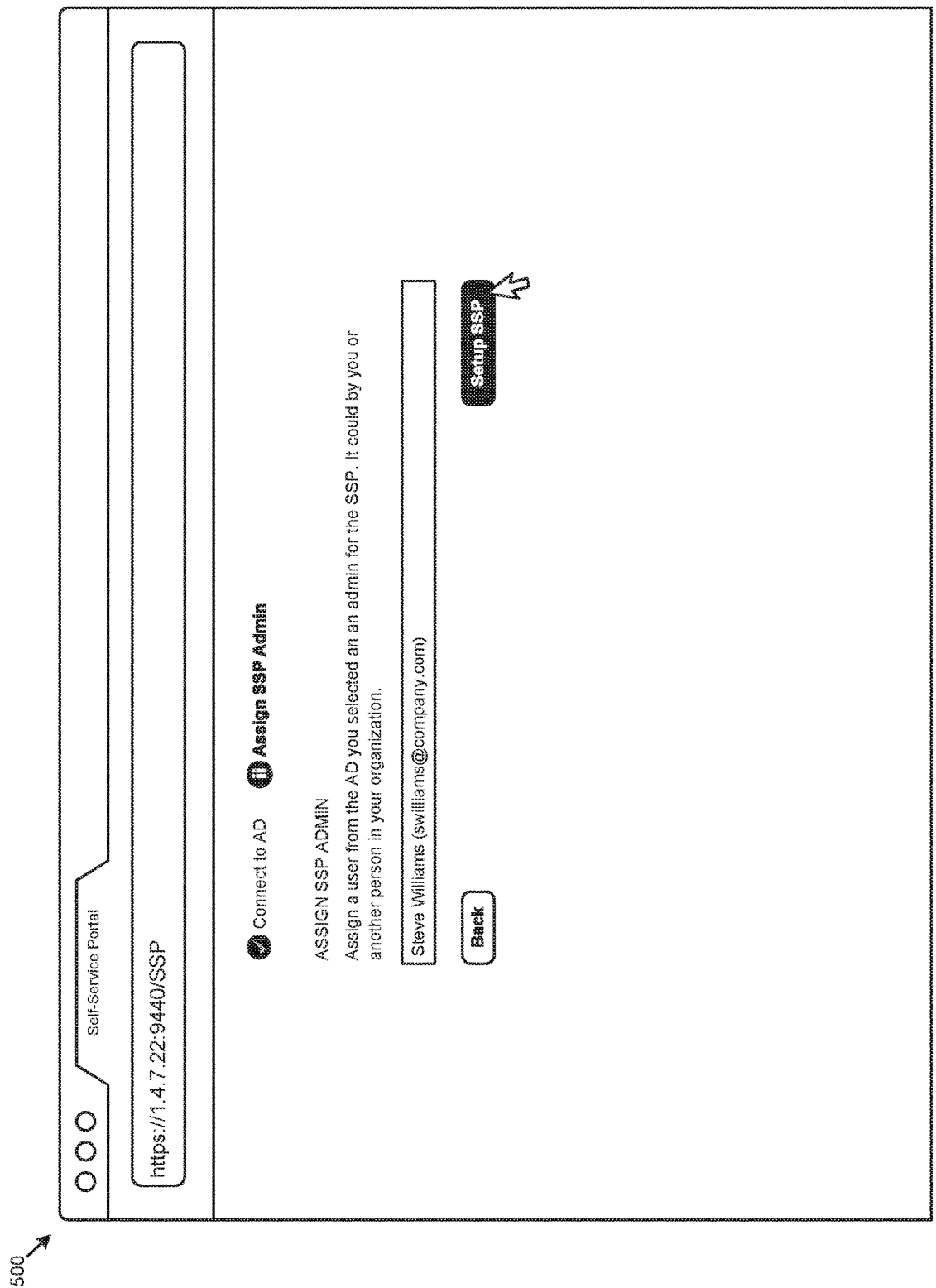
Figure 5H:
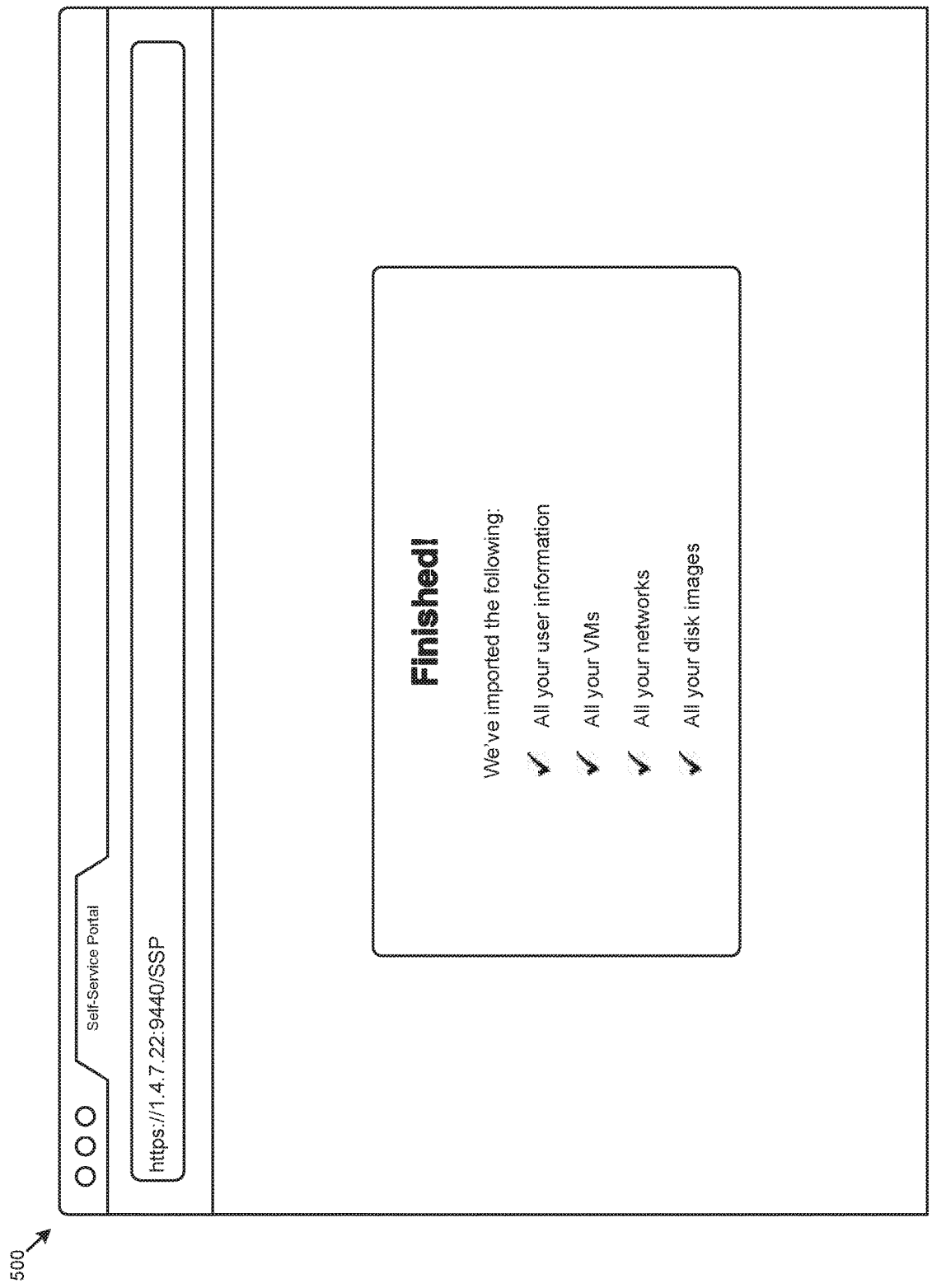

As shown in FIG. 5G, the SSP setup is completed by clicking a "Setup SSP" button. In certain embodiments, the SSP setup completion can invoke a transfer (e.g., mapping, import, etc.) of the source configuration information (e.g., from the AD) to the target computing environment. Specifically, as can be observed in FIG. 5H, information pertaining to users, VMs, networks, disk images, and/or other entities might be imported to the target computing environment.

One embodiment of a workflow pertaining to a self-service portal is disclosed in further detail as follows.

Figure 6:
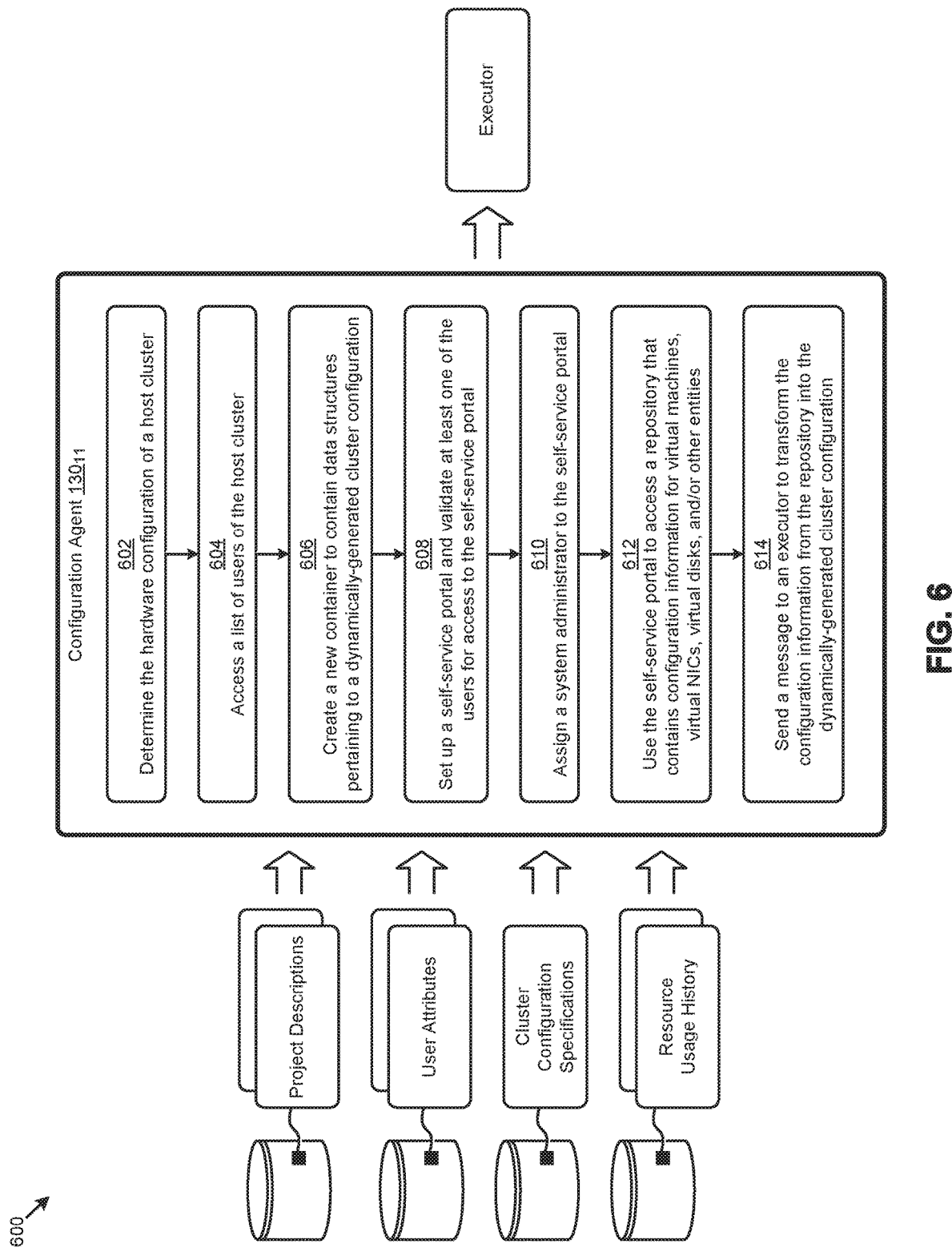
FIG. 6 is a flowchart of a workflow for establishing and configuring dynamically-generated cluster configurations in systems that facilitate efficient handling of configuration information between computing environments, according to an embodiment.

FIG. 6 is a flowchart of a workflow 600 for establishing and configuring dynamically-generated cluster configurations in systems that facilitate efficient handling of configuration information between computing environments. As an option, one or more variations of workflow 600 or any aspect thereof may be implemented in the context of the architecture and functionality of the embodiments described herein. The workflow 600 or any aspect thereof may be implemented in any environment.

The workflow 600 presents one embodiment of certain steps and/or operations for establishing and configuring dynamically-generated cluster configurations according to the herein disclosed techniques. As shown, the steps and/or operations can be performed by an instance of the configuration agent $130_{11}$. In the shown embodiment, the configuration agent accesses project descriptions, user attributes, cluster configuration specifications, resource usage history, and/or other information when performing the workflow 600. The configuration agent might also interact with an executor to carry out one or more steps and/or operations of workflow 600.

As illustrated, workflow 600 can commence by determining the hardware configuration of a host cluster (step 602). For example, the hardware configuration might be determined based at least in part on the cluster configuration specifications. A list of users of the host cluster (e.g., as described by the user attributes) are accessed (step 604). A new container to contain data structures pertaining to a dynamically-generated cluster configuration (e.g., for a target cluster) is created (step 606). A self-service portal (SSP) is set up with at least one of the users validated for accessing the SSP (step 608). A system administrator from the validated users is assigned to perform initial and any ongoing maintenance of the SSP (step 610). The SSP is used to connect to a repository that contains configuration information for virtual machines, virtual network interfaces, virtual network interfaces, virtual disks, and/or other entities from the host cluster (step 612). At step 614, a message is sent to the executor to transform (e.g., map) the configuration information from the repository (e.g., at the host cluster) into the dynamically-generated cluster configuration (e.g., for the target cluster).

Figure 7:
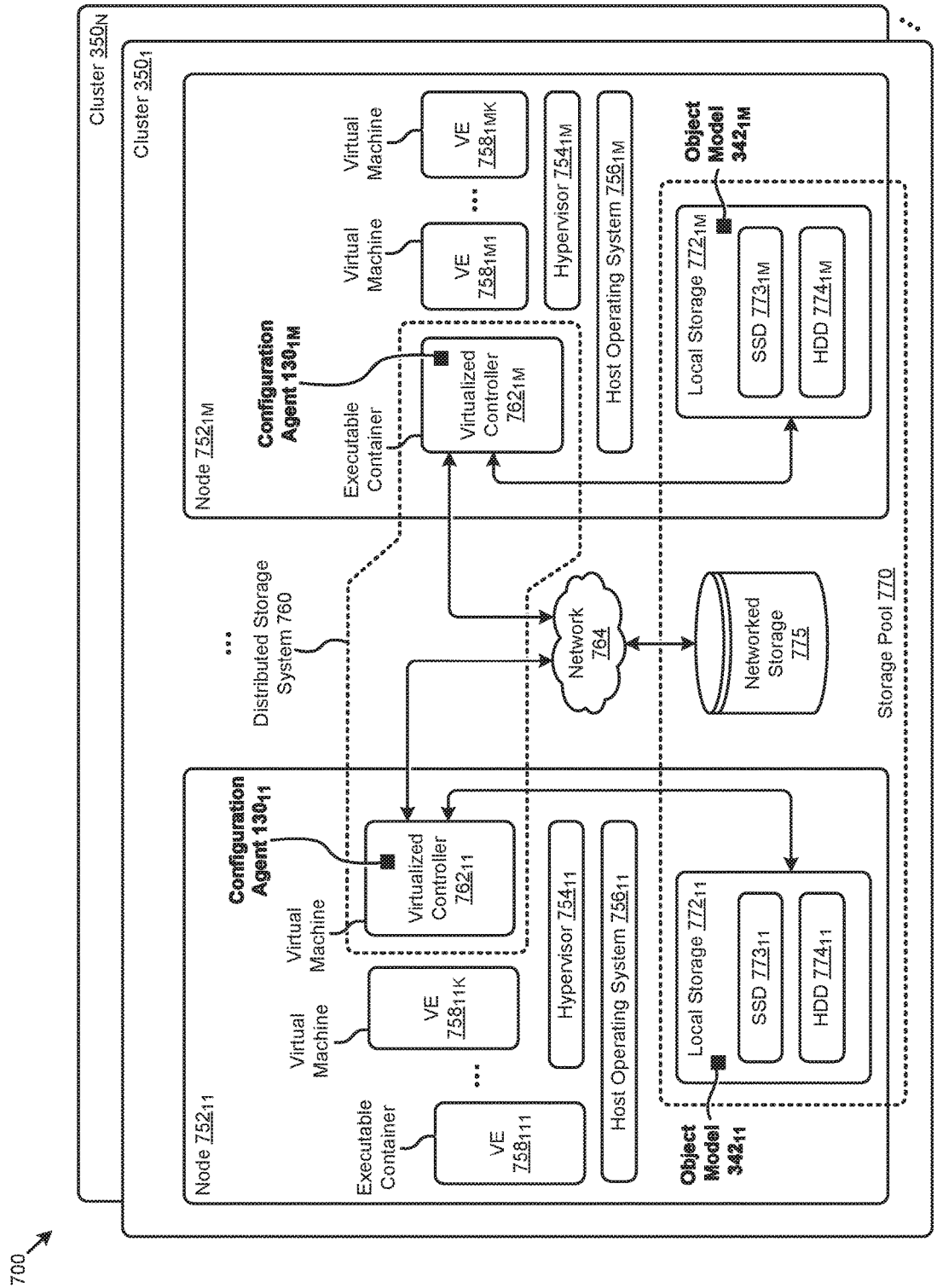
FIG. 7 presents a distributed virtualization environment for establishing and configuring dynamically-generated service portals in systems that facilitate in which embodiments of the present disclosure can be implemented.

An example of a distributed computing environment (e.g., distributed virtualization environment, etc.) that supports any of the herein disclosed techniques is presented and discussed as pertains to FIG. 7.

FIG. 7 presents a distributed virtualization environment 700 for establishing and configuring dynamically-generated service portals in systems that facilitate in which embodiments of the present disclosure can be implemented. As an option, one or more variations of distributed virtualization environment 700 or any aspect thereof may be implemented in the context of the architecture and functionality of the embodiments described herein.

The shown distributed virtualization environment depicts various components associated with one instance of a distributed virtualization system (e.g., hyperconverged distributed system) comprising a distributed storage system 760 that can be used to implement the herein disclosed techniques. Specifically, the distributed virtualization environment 700 comprises multiple clusters (e.g., cluster $350_1$, ..., cluster $350_N$) comprising multiple nodes that have multiple tiers of storage in a storage pool. Representative nodes (e.g., node $752_{11}$, ..., node $752_{1M}$) and storage pool 770 associated with cluster $350_1$ are shown. Each node can be associated with one server, multiple servers, or portions of a server. The nodes can be associated (e.g., logically and/or physically) with the clusters. As shown, the multiple tiers of storage include storage that is accessible through a network 764, such as a networked storage 775 (e.g., a storage area network or SAN, network attached storage or NAS, etc.). The multiple tiers of storage further include instances of local storage (e.g., local storage $772_{11}$, ..., local storage $772_{1M}$). For example, the local storage can be within or directly attached to a server and/or appliance associated with the nodes. Such local storage can include solid state drives (SSD $773_{11}$, ..., SSD $773_{1M}$), hard disk drives (HDD $774_{11}$, HDD $774_{1M}$), and/or other storage devices.

As shown, the nodes in distributed virtualization environment 700 can implement one or more user virtualized entities (e.g., VE $758_{111}$, VE $758_{11K}$, VE $758_{1M1}$, VE $758_{1MK}$), such as virtual machines (VMs) and/or containers. The VMs can be characterized as software-based computing "machines" implemented in a hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $756_{11}$, ..., host operating system $756_{1M}$), while the VMs run multiple applications on various respective guest operating systems. Such flexibility can be facilitated at least in part by a hypervisor (e.g., hypervisor $754_{11}$, ..., hypervisor $754_{1M}$), which hypervisor is logically located between the various guest operating systems of the VMs and the host operating system of the physical infrastructure (e.g., node).

As an example, hypervisors can be implemented using virtualization software (e.g., VMware ESXi, Microsoft Hyper-V, RedHat KVM, Nutanix AHV, etc.) that includes a hypervisor. In comparison, the containers (e.g., application containers or ACs) are implemented at the nodes in an operating system virtualization environment or container virtualization environment. The containers comprise groups of processes and/or resources (e.g., memory, CPU, disk, etc.) that are isolated from the node host computer and other containers. Such containers directly interface with the kernel of the host operating system (e.g., host operating system $756_{11}$, ..., host operating system $756_{1M}$) without, in most cases, a hypervisor layer. This lightweight implementation can facilitate efficient distribution of certain software components, such as applications or services (e.g., micro-services). As shown, distributed virtualization environment 700 can implement both a hypervisor-assisted virtualization environment and a container virtualization environment for various purposes.

Distributed virtualization environment 700 also comprises at least one instance of a virtualized controller to facilitate access to storage pool 770 by the VMs and/or containers.

As used in these embodiments, a virtualized controller is a collection of software instructions that serve to abstract details of underlying hardware or software components from one or more higher-level processing entities. A virtualized controller can be implemented as a virtual machine, as a container (e.g., a Docker container), or within a layer (e.g., such as a layer in a hypervisor).

Multiple instances of such virtualized controllers can coordinate within a cluster to form the distributed storage system 760 which can, among other operations, manage the storage pool 770. This architecture further facilitates efficient scaling of the distributed virtualization system. The foregoing virtualized controllers can be implemented in distributed virtualization environment 700 using various techniques. Specifically, an instance of a virtual machine at a given node can be used as a virtualized controller in a hypervisor-assisted virtualization environment to manage storage and I/O (input/output or IO) activities. In this case, for example, the virtualized entities at node $752_{11}$ can interface with a controller virtual machine (e.g., virtualized controller $762_{11}$) through hypervisor $754_{11}$ to access the storage pool 770. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 760.

For example, a hypervisor at one node in the distributed storage system 760 might correspond to VMware ESXi software, and a hypervisor at another node in the distributed storage system 760 might correspond to Nutanix AHV software. As another virtualized controller implementation example, containers (e.g., Docker containers) can be used to implement a virtualized controller (e.g., virtualized controller $762_{1M}$) in an operating system virtualization environment at a given node. In this case, for example, the virtualized entities at node $752_{1M}$ can access the storage pool 770 by interfacing with a controller container (e.g., virtualized controller $762_{1M}$) through hypervisor $754_{1M}$ and/or the kernel of host operating system $756_{1M}$.

In certain embodiments, one or more instances of a configuration agent can be implemented in the distributed storage system 760 to facilitate the herein disclosed techniques. Specifically, configuration agent $130_{11}$ can be implemented in the virtualized controller $762_{11}$, and configuration agent $130_{1M}$ can be implemented in the virtualized controller $762_{1M}$. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents (e.g., configuration agent). As further shown, instances of an object model (e.g., object model $342_{11}$, ..., object model $342_{1M}$) can be implemented in the local storage of the nodes in a cluster to store configuration parameters which have been dynamically generated according to the herein disclosed techniques.

ADDITIONAL EMBODIMENTS OF THE DISCLOSURE

Additional Practical Application Examples

Figure 8:
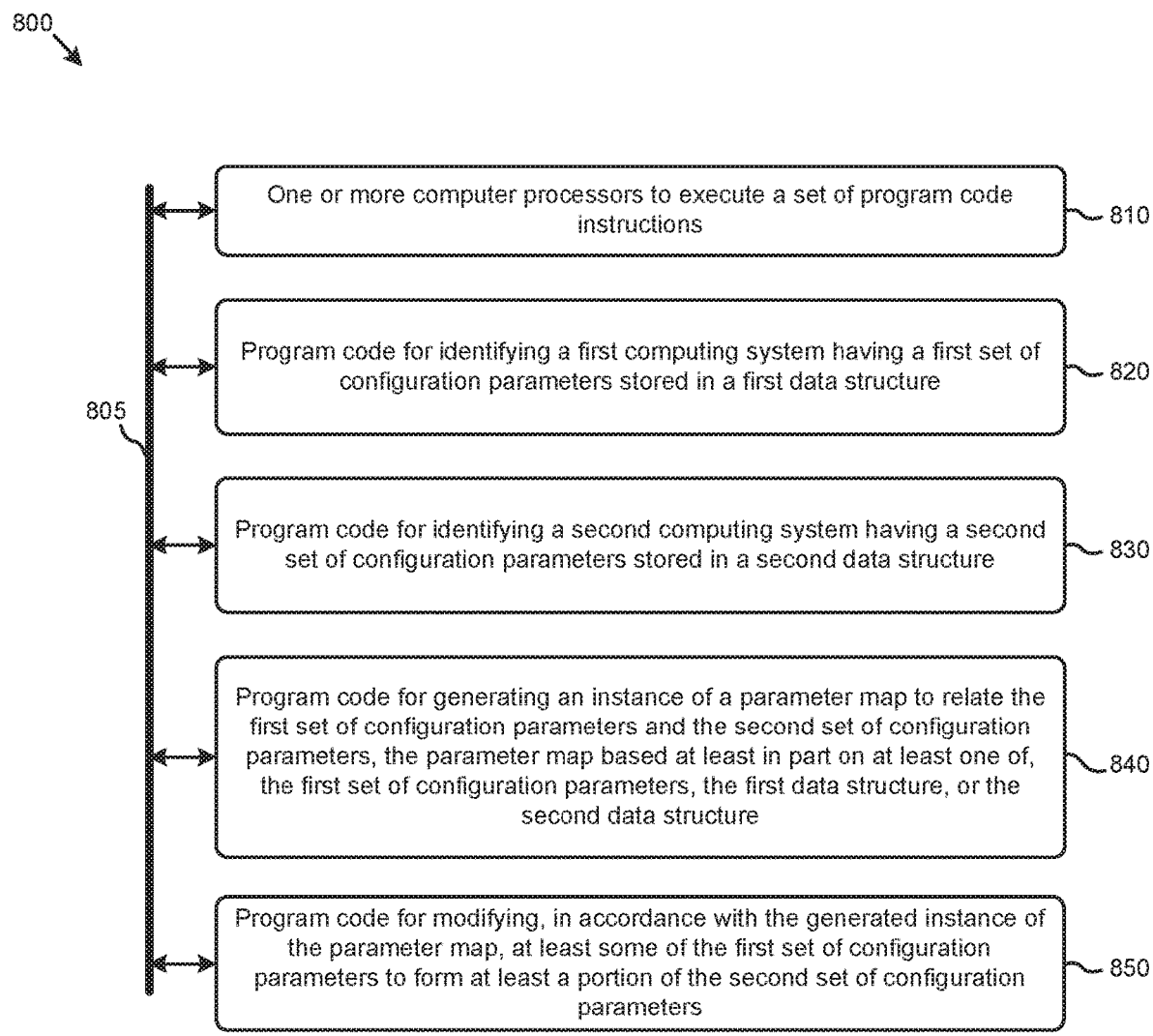
FIG. 8 depicts system components as arrangements of computing modules that are interconnected so as to implement certain of the herein-disclosed embodiments.

FIG. 8 depicts a system 800 as an arrangement of computing modules that are interconnected so as to operate cooperatively to implement certain of the herein-disclosed embodiments. This and other embodiments present particular arrangements of elements that, individually and/or as combined, serve to form improved technological processes that address efficiently establishing and/or updating the configuration of a computing cluster installed in a dynamically-changing computing environment. The partitioning of system 800 is merely illustrative and other partitions are possible. As an option, the system 800 may be implemented in the context of the architecture and functionality of the embodiments described herein. The system 800 or any operation therein may be carried out in any desired environment.

The system 800 comprises at least one processor and at least one memory, the memory serving to store program instructions corresponding to the operations of the system. As shown, an operation can be implemented in whole or in part using program instructions accessible by a module. The modules are connected to a communication path 805, and any operation can communicate with other operations over communication path 805. The modules of the system can, individually or in combination, perform method operations within system 800. Any operations performed within system 800 may be performed in any order unless as may be specified in the claims.

The shown embodiment implements a portion of a computer system, presented as system 800, comprising one or more computer processors to execute a set of program code instructions (module 810) and modules for accessing memory to hold program code instructions to perform: identifying a first computing system having a first set of configuration parameters stored in a first data structure (module 820); identifying a second computing system having a second set of configuration parameters stored in a second data structure (module 830); generating an instance of a parameter map to relate the first set of configuration parameters and the second set of configuration parameters, the parameter map based at least in part on at least one of, the first set of configuration parameters, the first data structure, or the second data structure (module 840); and modifying, in accordance with the generated instance of the parameter map, at least some of the first set of configuration parameters to form at least a portion of the second set of configuration parameters (module 850).

Figure 9A:
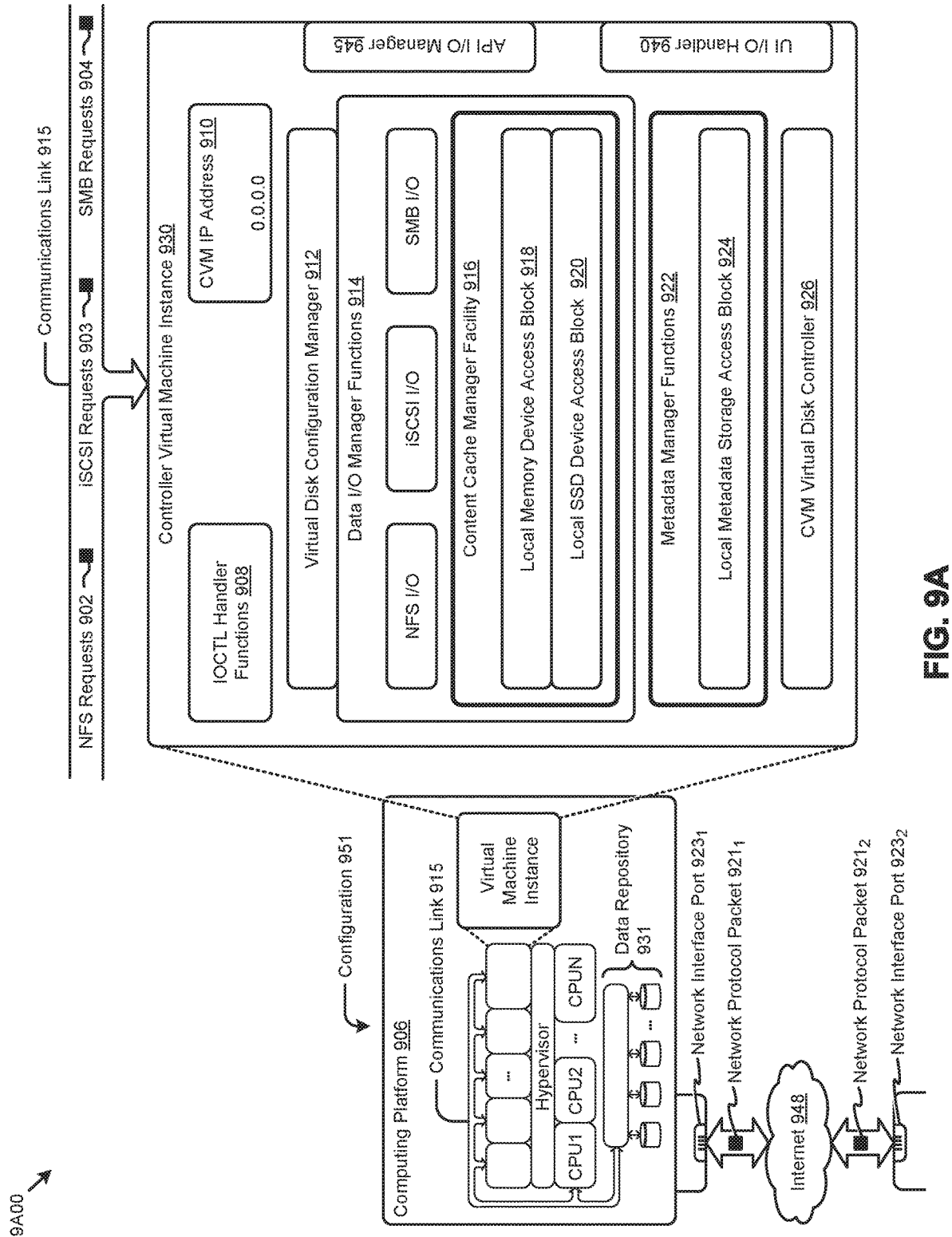
FIG. 9A, FIG. 9B, and FIG. 9C depict virtualized controller architectures comprising collections of interconnected components suitable for implementing embodiments of the present disclosure and/or for use in the herein-described environments.

Variations of the foregoing may include more or fewer of the shown modules. Certain variations may perform more or fewer (or different) steps, and/or certain variations may use data elements in more, or in fewer (or different) operations.
System Architecture Overview Additional System Architecture Examples FIG. 9A depicts a virtualized controller as implemented by the shown virtual machine architecture 9A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective, such as to provide high performance computing, high performance networking capabilities, and/or high performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 9A00 comprises a collection of interconnected components suitable for implementing embodiments of the present disclosure and/or for use in the herein-described environments. Moreover, virtual machine architecture 9A00 includes a virtual machine instance in configuration 951 that is further described as pertaining to controller virtual machine instance 930. Configuration 951 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 930.

In this and other configurations, a controller virtual machine instance receives block I/O (input/output or IO) storage requests as network file system (NFS) requests in the form of NFS requests 902, and/or internet small computer storage interface (iSCSI) block IO requests in the form of iSCSI requests 903, and/or Samba file system (SMB) requests in the form of SMB requests 904. The controller virtual machine (CVM) instance publishes and responds to an internet protocol (IP) address (e.g., CVM IP address 910). Various forms of input and output (I/O or IO) can be handled by one or more IO control handler functions (e.g., IOCTL handler functions 908) that interface to other functions such as data IO manager functions 914 and/or metadata manager functions 922. As shown, the data IO manager functions can include communication with virtual disk configuration manager 912 and/or can include direct or indirect communication with any of various block IO functions (e.g., NFS IO, iSCSI IO, SMB IO, etc.).

In addition to block IO functions, configuration 951 supports IO of any form (e.g., block IO, streaming IO, packet-based IO, HTTP traffic, etc.) through either or both of a user interface (UI) handler such as UI IO handler 940 and/or through any of a range of application programming interfaces (APIs), possibly through API IO manager 945.

Communications link 915 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as random access memory. As shown, controller virtual machine instance 930 includes content cache manager facility 916 that accesses storage locations, possibly including local dynamic random access memory (DRAM) (e.g., through the local memory device access block 918) and/or possibly including accesses to local solid state storage (e.g., through local SSD device access block 920).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 931, which in turn can be formatted into any one or more storage areas, and which can comprise parameterized storage accessible by a key (e.g., a filename, a table name, a block address, an offset address, etc.). External data repository 931 can store any forms of data, and may comprise a storage area dedicated to storage of metadata pertaining to the stored forms of data. In some cases, metadata can be divided into portions. Such portions and/or cache copies can be stored in the external storage data repository and/or in a local storage area (e.g., in local DRAM areas and/or in local SSD areas). Such local storage can be accessed using functions provided by local metadata storage access block 924. External data repository 931 can be configured using CVM virtual disk controller 926, which can in turn manage any number or any configuration of virtual disks.

Execution of the sequences of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 951 can be coupled by communications link 915 (e.g., backplane, LAN, PSTN, wired or wireless network, etc.) and each instance may perform respective portions of sequences of instructions as may be required to practice embodiments of the disclosure.

The shown computing platform 906 is interconnected to the Internet 948 through one or more network interface ports (e.g., network interface port $923_1$ and network interface port $923_2$). Configuration 951 can be addressed through one or more network interface ports using an IP address. Any operational element within computing platform 906 can perform sending and receiving operations using any of a range of network protocols, possibly including network protocols that send and receive packets (e.g., network protocol packet $921_1$ and network protocol packet $921_2$).

Computing platform 906 may transmit and receive messages that can be composed of configuration data and/or any other forms of data and/or instructions organized into a data structure (e.g., communications packets). In some cases, the data structure includes program code instructions (e.g., application code) communicated through the Internet 948 and/or through any one or more instances of communications link 915. Received program code may be processed and/or executed by a CPU as it is received and/or program code may be stored in any volatile or non-volatile storage for later execution. Program code can be transmitted via an upload (e.g., an upload from an access device over the Internet 948 to computing platform 906). Further, program code and/or the results of executing program code can be delivered to a particular user via a download (e.g., a download from computing platform 906 over the Internet 948 to an access device).

Configuration 951 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to efficient mapping of configuration information between computing environments. In some embodiments, a module may include one or more state machines and/or combinational logic used to implement or facilitate the operational and/or performance characteristics pertaining to efficient mapping of configuration information between computing environments.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of techniques for dynamically mapping configuration information between computing environments). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to efficient mapping of configuration information between computing environments, and/or for improving the way data is manipulated when performing computerized operations for dynamically mapping the configuration information of an existing computing environment to the configuration information of new computing equipment to facilitate operation of the new computing equipment.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 9B:
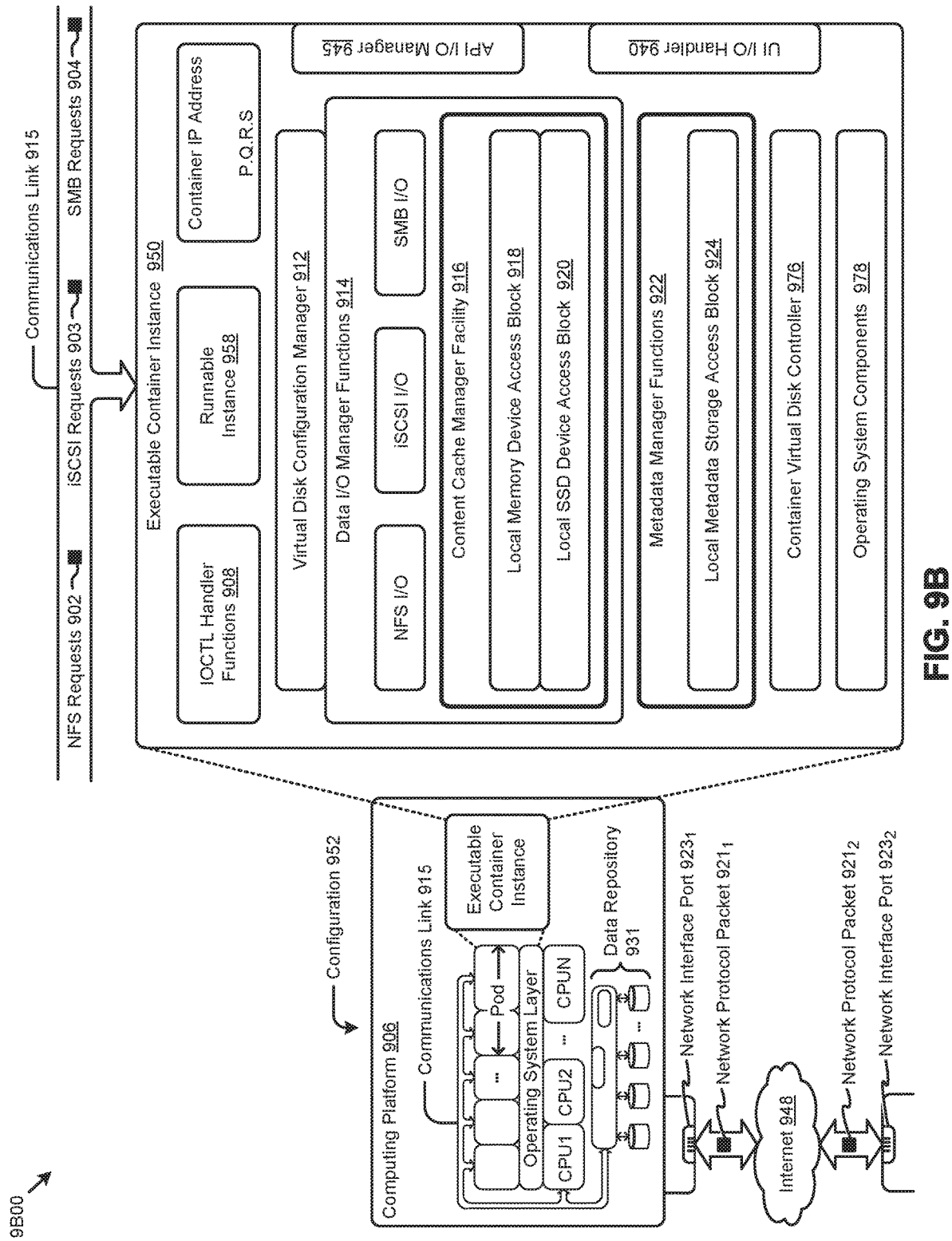

FIG. 9B depicts a virtualized controller implemented by containerized architecture 9B00. The containerized architecture comprises a collection of interconnected components suitable for implementing embodiments of the present disclosure and/or for use in the herein-described environments. Moreover, the shown containerized architecture 9B00 includes an executable container instance in configuration 952 that is further described as pertaining to the executable container instance 950. Configuration 952 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any executable container (e.g., executable container instance 950). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container. Any executable container of any sort can be rooted in a directory system, and can be configured to be accessed by file system commands (e.g., "ls" or "ls-a", etc.). The executable container might optionally include operating system components 978, however such a separate set of operating system components need not be provided. As an alternative, an executable container can include runnable instance 958, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 976. Such a container virtual disk controller can perform any of the functions that the aforementioned CVM virtual disk controller 926 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 9C:
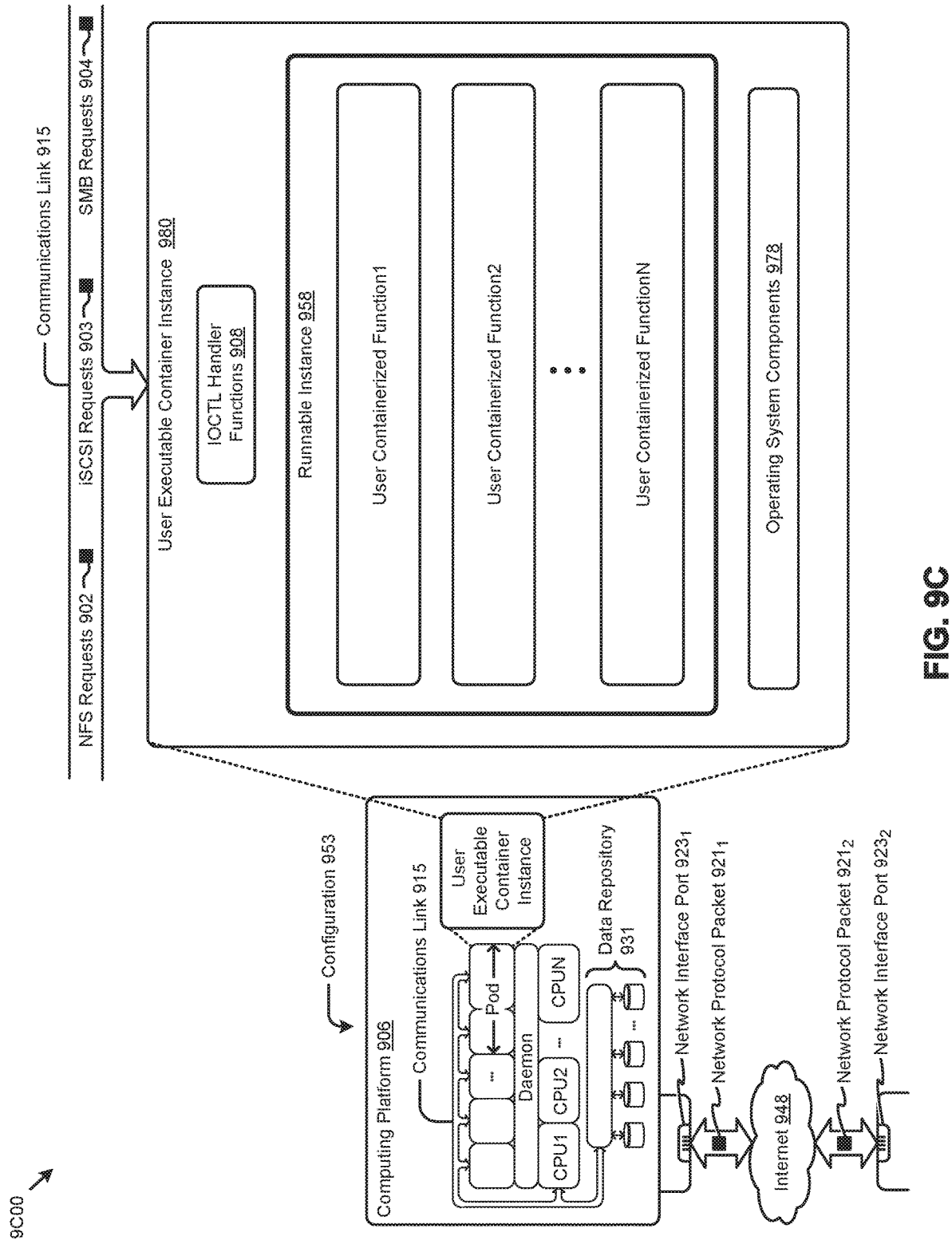

FIG. 9C depicts a virtualized controller implemented by a daemon-assisted containerized architecture 9C00. The containerized architecture comprises a collection of interconnected components suitable for implementing embodiments of the present disclosure and/or for use in the herein-described environments. Moreover, the shown instance of daemon-assisted containerized architecture includes a user executable container instance in configuration 953 that is further described as pertaining to user executable container instance 980. Configuration 953 includes a daemon layer (as shown) that performs certain functions of an operating system.

User executable container instance 980 comprises any number of user containerized functions (e.g., user containerized function1, user containerized function2, . . . , user containerized functionN). Such user containerized functions can execute autonomously, or can be interfaced with or wrapped in a runnable object to create a runnable instance (e.g., runnable instance 958). In some cases, the shown operating system components 978 comprise portions of an operating system, which portions are interfaced with or included in the runnable instance and/or any user containerized functions. In this embodiment of a daemon-assisted containerized architecture, the computing platform 906 might or might not host operating system components other than operating system components 978. More specifically, the shown daemon might or might not host operating system components other than operating system components 978 of user executable container instance 980.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
   automatically generating a parameter map for adding a new hyperconverged unit to an existing computing system, wherein
      the existing computing system comprises an existing hyperconverged unit and has a first configuration in a first format;
      the new hyperconverged unit has a second configuration in a second format different from the first format; and
      the parameter map is generated to map between the first configuration and the second configuration to integrate the new hyperconverged unit into the existing computing system; and
   updating, in accordance with the parameter map, at least one of the first configuration or the second configuration to integrate the new hyperconverged unit with the existing computing system.

2. The method of claim 1, further comprising validating the parameter map that maps at least a part of the first configuration into the second configuration; and
   persisting the second configuration at the new hyperconverged unit.

3. The method of claim 2, wherein the first configuration comprises existing environment information for at least one of an existing virtual machine, an existing virtual disk, or an existing virtual network interface controller, and the second configuration comprises new environment information that corresponds to an object model schema.

4. The method of claim 1, further comprising augmenting an initial configuration of the new hyperconverged unit with first mapped configuration in the second format, wherein the new hyperconverged unit comprises a virtual entity, and the first mapped configuration is mapped from at least some of the first configuration in the first format.

5. The method of claim 1, further comprising upon detecting at least one change to the first configuration, updating the second configuration at least by applying the at least one change, which has been detected, to the parameter map.

6. The method of claim 1, wherein the first configuration comprises existing information about the existing computing system including a distributed storage system and an existing hyperconverged unit, the existing hyperconverged unit comprises an existing storage device in the distributed storage system, the second configuration comprises new information a new storage device that is added to the distributed storage system when the new hyperconverged unit is added to the existing computing system.

7. The method of claim 1, wherein the existing computing system comprises a distributed storage system and an existing virtualized controller that executes on an existing computing node, the new hyperconverged unit comprises a new virtualized controller executing on a new computing node that is added to the existing computing system when the hyperconverged unit is added to the existing computing system, and the existing virtualized controller and the new virtualized controller manage access requests to the distributed storage system using at least the second configuration.

8. The method of claim 1, wherein the first configuration in the first format is organized or stored based at least in part upon an active directory schema.

9. A non-transitory computer readable medium having stored thereon a sequence of instructions which, when stored in memory and executed by a processor, causes the processor to perform a set of acts, the set of acts comprising:
  automatically generating a parameter map for adding a new hyperconverged unit to an existing computing system, wherein
    the existing computing system comprises an existing hyperconverged unit and has a first configuration in a first format;
    the new hyperconverged unit has a second configuration in a second format different from the first format; and
    the parameter map is generated to map between the first configuration and the second configuration to integrate the new hyperconverged unit into the existing computing system; and
  updating, in accordance with the parameter map, at least one of the first configuration or the second configuration to integrate the new hyperconverged unit with the existing computing system.

10. The non-transitory computer readable medium of claim 9, wherein the first configuration comprises existing environment information for at least one of an existing virtual machine, an existing virtual disk, or an existing virtual network interface controller, and the second configuration comprises new environment information that corresponds to an object model schema.

11. The non-transitory computer readable medium of claim 9, wherein the first configuration derives from a user directory that is accessed over a lightweight directory access protocol (LDAP).

12. The non-transitory computer readable medium of claim 9, wherein the set of acts further comprises upon detecting at least one change to the first configuration, updating the second configuration at least by applying the at least one change, which has been detected, to the parameter map.

13. The non-transitory computer readable medium of claim 9, wherein the existing computing system comprises a distributed storage system and an existing hyperconverged unit, the existing hyperconverged unit comprises an existing storage device in the distributed storage system, the new hyperconverged unit comprises a new storage device that is added to the distributed storage system when the new hyperconverged unit is added to the existing computing system.

14. The non-transitory computer readable medium of claim 9, wherein the sequence of instructions further comprises instructions for provisioning access to the first configuration through a user interface.

15. The non-transitory computer readable medium of claim 9, wherein the first configuration in the first format is organized or stored based at least in part upon an active directory schema.

16. The non-transitory computer readable medium of claim 9, wherein the parameter map is based at least in part on a user-specified mapping parameter or a selection filter, and the first configuration comprises existing information about a distributed storage system and an existing virtualized controller that executes on an existing computing node, and the second configuration comprises information about a new virtualized controller executing on a new computing node that is added to the existing computing system when the hyperconverged unit is added to the existing computing system, and the existing virtualized controller and the new virtualized controller manage access requests to the distributed storage system using at least the second configuration.

17. The non-transitory computer readable medium of claim 9, wherein the set of acts further comprises validating the parameter map based at least in part upon historical data or a user preference.

18. The non-transitory computer readable medium of claim 9, wherein the sequence of instructions further comprises instructions for augmenting an initial configuration of the new hyperconverged unit with first mapped configuration in the second format, and the first mapped configuration is mapped from at least some of the first configuration in the first format, and the new hyperconverged unit comprises a virtual entity.

19. A system for computer-aided computing system configuration management, the system comprising:
  a non-transitory storage medium having stored thereon a sequence of instructions; and
  a processor that executes the sequence of instructions, an execution of the sequence of instructions causing the processor to perform a set of acts, the set of acts comprising,
    automatically generating a parameter map for adding a new hyperconverged unit to an existing computing system, wherein
      the existing computing system comprises an existing hyperconverged unit and has a first configuration in a first format;

the new hyperconverged unit has a second configuration in a second format different from the first format; and the parameter map is generated to map between the first configuration and a second configuration to integrate the new hyperconverged unit into the existing computing system; and updating, in accordance with the parameter map, at least one of the first configuration or the second configuration to integrate the new hyperconverged unit with the existing computing system.

20. The system of claim 19, wherein the set of acts further comprises validating the parameter map that maps at least a part of the first configuration into the second configuration; and persisting the second configuration at the new hyperconverged unit.

21. The system of claim 20, wherein the first configuration comprises existing environment information for at least one of an existing virtual machine, an existing virtual disk, or an existing virtual network interface controller, and the second configuration comprises new environment information that corresponds to an object model schema.

22. The system of claim 19, wherein the set of acts further comprises augmenting an initial configuration of the new hyperconverged unit with first mapped configuration in the second format, the first mapped configuration is mapped from at least some of the first configuration in the first format, and the new is hyperconverged unit comprises a virtual entity.

23. The system of claim 19, wherein the set of acts further comprises upon detecting at least one change to the first configuration, updating the second configuration at least by applying the at least one change, which has been detected, to the parameter map.

24. The system of claim 19, wherein the first configuration in the first format is organized or stored based at least in part upon an active directory schema.

* * * * *